United States Patent
Zhu et al.

(10) Patent No.: US 11,451,316 B2
(45) Date of Patent: Sep. 20, 2022

(54) CLOCK SYNCHRONIZATION METHOD AND APPARATUS

(71) Applicant: HUAWEI TECHNOLOGIES CO., LTD., Guangdong (CN)

(72) Inventors: Fangyuan Zhu, Beijing (CN); Yongcui Li, Beijing (CN); Yan Li, Beijing (CN); Feng Yu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 22 days.

(21) Appl. No.: 17/208,044

(22) Filed: Mar. 22, 2021

(65) Prior Publication Data
US 2021/0211215 A1  Jul. 8, 2021

Related U.S. Application Data

(63) Continuation of application No. PCT/CN2019/113250, filed on Oct. 25, 2019.

(30) Foreign Application Priority Data

Oct. 25, 2018 (CN) .......................... 201811250359.9

(51) Int. Cl.
*H04J 3/06* (2006.01)
*H04W 8/20* (2009.01)
*H04L 101/622* (2022.01)

(52) U.S. Cl.
CPC ............. *H04J 3/0685* (2013.01); *H04W 8/20* (2013.01); *H04L 2101/622* (2022.05)

(58) Field of Classification Search
CPC . G06F 1/12; G06F 1/14; H04L 7/0012; H04L 7/0008; H04W 56/001;
(Continued)

(56) References Cited

U.S. PATENT DOCUMENTS

2017/0251508 A1* 8/2017 Park ................. H04W 72/1205
2018/0227067 A1   8/2018 Hu et al.
(Continued)

FOREIGN PATENT DOCUMENTS

| CN | 1716949 A | 1/2006 |
|---|---|---|
| CN | 101359238 A | 2/2009 |

(Continued)

OTHER PUBLICATIONS

Extended European Search Report issued in European Application No. 19876843.4 dated Oct. 28, 2021, 6 pages.
(Continued)

*Primary Examiner* — Wutchung Chu
(74) *Attorney, Agent, or Firm* — Fish & Richardson P.C.

(57) ABSTRACT

Methods, systems, and apparatus for clock synchronization are provided. In one aspect, a clock synchronization method includes: receiving, by a terminal and from an access network device, information about N clock domains, determining, by the terminal, M clock domains that are associated with the terminal and that are in the N clock domains, and separately performing, by the terminal, clock synchronization with clock sources of the M clock domains based on information about the M clock domains. Information about a clock domain includes first time information and a clock domain number of the clock domain. The first time information includes a time of a clock source of the clock domain when the access network device sends the information about the clock domain. The clock domain number identifies the clock domain. N is an integer greater than 1, and M is an integer greater than 1.

18 Claims, 9 Drawing Sheets

(58) Field of Classification Search
CPC ..... H04W 56/00; H04J 3/0685; H04J 3/0658; H04J 3/0644; H04J 3/0638; H04J 3/0635
See application file for complete search history.

(56) References Cited

U.S. PATENT DOCUMENTS

| | | | |
|---|---|---|---|
| 2019/0042525 A1* | 2/2019 | McElrath | G06F 13/4291 |
| 2019/0059066 A1* | 2/2019 | Harmatos | H04J 3/0673 |
| 2019/0089472 A1* | 3/2019 | Zhang | H04N 21/8547 |
| 2019/0165927 A1* | 5/2019 | Wang | H04L 7/06 |
| 2020/0097038 A1* | 3/2020 | Kinnerk | G06F 1/14 |
| 2021/0211215 A1* | 7/2021 | Zhu | H04J 3/0685 |

FOREIGN PATENT DOCUMENTS

| | | |
|---|---|---|
| CN | 101515832 A | 8/2009 |
| CN | 103634091 A | 3/2014 |
| CN | 105634639 A | 6/2016 |
| CN | 108234052 A | 6/2018 |
| EP | 3404866 A1 | 11/2018 |
| WO | 2012116087 A1 | 8/2012 |
| WO | 2017152412 A1 | 9/2017 |
| WO | WO-2017152412 A1 * | 9/2017 ............... H03L 7/00 |

OTHER PUBLICATIONS

3GPP TS 36.331 V15.3.0 (Sep. 2018), "3rd Generation Partnership Project; Technical Specification Group Radio Access Network; Evolved Universal Terrestrial Radio Access (E-UTRA); Radio Resource Control (RRC); Protocol specification (Release 15)," Sep. 2018, 918 pages.

Huawei, HiSilicon, "Discussion on the motivation of High Accuracy Time Synchronization for URLLC," 3GPP TSG RAN WG1 Meeting #92bis, R1-1804429, Sanya, China, Apr. 16-20, 2018, 7 pages.

Office Action issued in Chinese Application No. 201811250359.9 dated Sep. 9, 2020, 6 pages.

PCT International Search Report and Written Opinion issued in International Application No. PCT/CN2019/113250 dated Jan. 10, 2020, 11 pages (partial English translation).

Qualcomm Incorporated, "Some considerations around TSN," SA WG2 Meeting #128bis, S2-187736, Sophia Antipolis, France, Aug. 20-24, 2018, 13 pages.

\* cited by examiner

CLOCK SYNCHRONIZATION METHOD AND APPARATUS

CROSS-REFERENCE TO RELATED APPLICATIONS

This application is a continuation of International Application No. PCT/CN2019/113250, filed on Oct. 25, 2019, which claims priority to Chinese Patent Application No. 201811250359.9, filed on Oct. 25, 2018. The disclosures of the aforementioned applications are hereby incorporated by reference in their entireties.

TECHNICAL FIELD

This application relates to the field of mobile communications technologies, and in particular, to a clock synchronization method and an apparatus.

BACKGROUND

In current communication, one terminal may perform clock synchronization with a clock source of one clock domain by using an access network device, so that the terminal can perform the clock synchronization with the clock source of the clock domain.

With development of communications technologies, one terminal may need to be associated with clock sources of a plurality of clock domains. In this scenario, how to implement clock synchronization between the terminal and the clock sources of the plurality of clock domains by using the access network device is a problem that needs to be resolved.

SUMMARY

This application provides a clock synchronization method and an apparatus, to implement clock synchronization between a terminal and a plurality of clock sources.

According to a first aspect, this application provides a clock synchronization method. The method includes: A terminal receives information that is about N clock domains and that is sent by an access network device. Information about one clock domain includes first time information and a clock domain number of the clock domain, the first time information includes a time of a clock source of the clock domain when the access network device sends the information about the clock domain, the clock domain number is used to identify the clock domain, and N is an integer greater than 1. The terminal determines M clock domains that are associated with the terminal and that are in the N clock domains, where M is a positive integer. The terminal separately performs clock synchronization with clock sources of the M clock domains based on information about the M clock domains. Based on this solution, when one terminal is associated with the clock sources of the M clock domains, clock synchronization between the terminal and the M clock sources may be implemented.

In a possible implementation, the information about the clock domain further includes a frequency offset ratio between a local clock of the access network device and the clock source of the clock domain.

In a possible implementation, that a terminal receives information that is about N clock domains and that is sent by an access network device includes:

the terminal receives broadcast information sent by the access network device. The broadcast information includes the information about the N clock domains, or the terminal receives unicast information sent by the access network device. The unicast information includes the information about the N clock domains, or the terminal receives N pieces of unicast information sent by the access network device. One piece of unicast information includes information about one of the N clock domains.

According to the foregoing method, the access network device may send the information about the N clock domains to the terminal in a plurality of implementations.

In a possible implementation, that the terminal determines M clock domains that are associated with the terminal and that are in the N clock domains includes: In a procedure of establishing a session, the terminal obtains, from a core network element, clock domain numbers of the M clock domains associated with the terminal. The core network element stores an association relationship between an identifier of the terminal and the clock domain numbers of the M clock domains.

The identifier of the terminal includes one or more of the following:

a generic public subscription identifier GPSI of the terminal;

an IP address associated with the session; and at least one media access control MAC address associated with the terminal.

In another possible implementation, that the terminal determines M clock domains that are associated with the terminal and that are in the N clock domains includes: The terminal obtains, from a core network element, clock domain numbers of the M clock domains associated with the terminal. The core network element includes a data management network element or a policy control network element. The core network element stores an association relationship between subscription information of the terminal and the clock domain numbers of the M clock domains associated with the terminal; or the core network element stores subscription information of the terminal, and the subscription information includes the clock domain numbers of the M clock domains.

According to the foregoing method, the terminal may determine, in a plurality of different manners, the M clock domains associated with the terminal.

In a possible implementation, before the terminal receives the information that is about the N clock domains and that is sent by the access network device, the terminal performs timing advance measurement with the access network device to obtain a timing advance value. The timing advance value is used to determine a transmission delay between the terminal and the access network device.

In a possible implementation, that the terminal performs clock synchronization with clock sources of the M clock domains based on information about the M clock domains includes: For an $i^{th}$ clock domain of the M clock domains, the terminal determines second time information of the $i^{th}$ clock domain based on information about the $i^{th}$ clock domain and the timing advance value. The second time information includes a time of a clock source of the $i^{th}$ clock domain when the terminal receives the information that is about the $i^{th}$ clock domain and that is sent by the access network device, and i ranges from 1 to M.

According to the foregoing method, the terminal may separately perform clock synchronization with the clock sources of the M clock domains, thereby implementing clock synchronization between the terminal and one or more clock sources.

According to a second aspect, this application provides a clock synchronization method. The method includes: An access network device separately performs clock synchronization with clock sources of N clock domains. After completing the clock synchronization with the clock sources of the N clock domains, the access network device sends information about the N clock domains to a terminal. Information about one clock domain includes first time information and a clock domain number of the clock domain, the first time information includes a time of a clock source of the clock domain when the access network device sends the information about the clock domain, the clock domain number is used to identify the clock domain, and N is an integer greater than 1. Based on this solution, the access network device may send, to the terminal, the clock sources of the N clock domains supported by the base station, so that the base station can select, from the N clock sources, a clock domain associated with the terminal to perform clock synchronization.

In a possible implementation, the information about the clock domain further includes a frequency offset ratio between a local clock of the access network device and the clock source of the clock domain.

In a possible implementation, that the access network device sends information about the N clock domains to a terminal includes:

The access network device sends broadcast information. The broadcast information includes the information about the N clock domains. Alternatively, the access network device sends unicast information to the terminal. The unicast information includes the information about the N clock domains. Alternatively, the access network device sends N pieces of unicast information to the terminal. One piece of unicast information includes information about one of the N clock domains.

According to the foregoing method, the access network device may send the information about the N clock domains to the terminal in a plurality of implementations.

In a possible implementation, before the access network device sends the information about the N clock domains to the terminal, the access network device receives clock domain numbers that are of the N clock domains and that are sent by the terminal or a core network element.

According to a third aspect, this application provides a clock synchronization method. The method includes: A terminal sends, to an access network device, clock domain numbers of M clock domains associated with the terminal, where M is a positive integer. The terminal receives information that is about the M clock domains corresponding to M clock domain numbers and that is sent by the access network device. Information about one clock domain includes first time information and a clock domain number of the clock domain, the first time information includes a time of a clock source of the clock domain when the access network device sends the information about the clock domain, the clock domain number is used to identify the clock domain, and N is an integer greater than 1. The terminal separately performs clock synchronization with clock sources of the M clock domains based on information about the M clock domains. Based on this solution, when one terminal is associated with the clock sources of the M clock domains, clock synchronization between the terminal and the M clock sources may be implemented.

In a possible implementation, the information about the clock domain further includes a frequency offset ratio between a local clock of the access network device and the clock source of the clock domain.

In a possible implementation, that the terminal receives information that is about the M clock domains corresponding to M clock domain numbers and that is sent by the access network device includes:

The terminal receives broadcast information sent by the access network device. The broadcast information includes the information about the M clock domains. Alternatively, the terminal receives unicast information sent by the access network device. The unicast information includes the information about the M clock domains. Alternatively, the terminal receives M pieces of unicast information sent by the access network device. One piece of unicast information includes information about one of the M clock domains.

According to the foregoing method, the access network device may send the information about the N clock domains to the terminal in a plurality of implementations.

In a possible implementation, before the terminal sends, to the access network device, the clock domain numbers of the M clock domains associated with the terminal, the terminal determines the M clock domains associated with the terminal.

In a possible implementation, that the terminal determines the M clock domains associated with the terminal includes: In a procedure of establishing a session, the terminal obtains, from a core network element, the clock domain numbers of the M clock domains associated with the terminal. The core network element stores an association relationship between an identifier of the terminal and the clock domain numbers of the M clock domains. The identifier of the terminal includes one or more of the following: a GPSI of the terminal, an IP address associated with the session, and at least one MAC address associated with the terminal.

In another possible implementation, that the terminal determines the M clock domains associated with the terminal includes: The terminal obtains, from a core network element, the clock domain numbers of the M clock domains associated with the terminal. The core network element includes a data management network element or a policy control network element. The core network element stores an association relationship between subscription information of the terminal and the clock domain numbers of the M clock domains associated with the terminal; or the core network element stores subscription information of the terminal, and the subscription information includes the clock domain numbers of the M clock domains.

According to the foregoing method, the terminal may determine, in a plurality of different manners, the M clock domains associated with the terminal.

In a possible implementation, before the terminal receives the information that is about the M clock domains and that is sent by the access network device, the terminal performs timing advance measurement with the access network device to obtain a timing advance value. The timing advance value is used to determine a transmission delay between the terminal and the access network device.

In a possible implementation, that the terminal performs clock synchronization with clock sources of the M clock domains based on information about the M clock domains includes: For an $i^{th}$ clock domain of the M clock domains, the terminal determines second time information of the $i^{th}$ clock domain based on information about the $i^{th}$ clock domain and the timing advance value. The second time information includes a time of a clock source of the $i^{th}$ clock domain when the terminal receives the information that is about the $i^{th}$ clock domain and that is sent by the access network device, and i ranges from 1 to M.

According to the foregoing method, the terminal may separately perform clock synchronization with the clock sources of the M clock domains, thereby implementing clock synchronization between the terminal and a plurality of clock sources.

According to a fourth aspect, this application provides a method for determining a clock domain. The method includes: A session management network element receives a session request message that is from a terminal. The session management network element sends an authentication authorization request message to an authentication authorization and accounting device. The authentication authorization request message includes an identifier of the terminal. The session management network element receives clock domain numbers that are of M clock domains and that are sent by the authentication authorization and accounting device. The M clock domains are clock domains associated with the terminal, and there is an association relationship between the clock domain numbers of the M clock domains and the identifier of the terminal. The session management network element sends the clock domain numbers of the M clock domains to the terminal. The identifier of the terminal includes one or more of the following: a GPSI of the terminal, an IP address associated with a session, and at least one MAC address associated with the terminal. According to the method, the session management network element may obtain, from the authentication authorization and accounting device, the clock domain number of the clock domain associated with the terminal, and send the clock domain number to the terminal, so that the terminal can learn of the clock domain associated with the terminal.

According to a fifth aspect, this application provides a method for determining a clock domain. The method includes: A data management network element obtains subscription information of a terminal. The data management network element determines, based on the subscription information of the terminal, clock domain numbers of M clock domains associated with the terminal. The data management network element sends the clock domain numbers of the M clock domains to the terminal. The data management network element stores an association relationship between the subscription information of the terminal and the clock domain numbers of the M clock domains associated with the terminal, or the data management network element stores the subscription information of the terminal, and the subscription information includes the clock domain numbers of the M clock domains. According to the method, the data management network element may obtain the clock domain number of the clock domain associated with the terminal, and send the clock domain number to the terminal, so that the terminal can learn of the clock domain associated with the terminal.

According to a sixth aspect, this application provides a method for determining a clock domain. The method includes: A policy control network element generates policy information. The policy information includes clock domain numbers of M clock domains corresponding to an application to which a terminal subscribes. The policy control network element sends the policy information to the terminal. According to the method, the policy control network element may obtain the clock domain number of the clock domain associated with the terminal, and send the clock domain number to the terminal, so that the terminal can learn of the clock domain associated with the terminal.

In a possible implementation, the policy information includes the clock domain numbers of the M clock domains corresponding to the application to which the terminal subscribes. Before generating the policy information, the policy control network element obtains subscription information of the terminal from a data storage network element. The subscription information includes the application to which the terminal subscribes. The policy control network element determines the clock domain numbers of the M clock domains corresponding to the application to which the terminal subscribes.

According to a seventh aspect, this application provides a communications apparatus. The communications apparatus has a function of implementing the terminal or the access network device in the foregoing method embodiments. The function may be implemented by hardware, or may be implemented by hardware by executing corresponding software. The hardware or the software includes one or more modules corresponding to the foregoing function.

In a possible design, the communications apparatus includes a processor, a memory, a bus, and a communications interface. The memory stores a computer executable instruction, and the processor is connected to the memory through the bus. When the communications apparatus runs, the processor executes the computer executable instruction stored in the memory, so that the communications apparatus performs the clock synchronization method according to any one of the first aspect to the third aspect or the implementations of the first aspect to the third aspect. For example, the communications apparatus may be a terminal or an access network device.

In another possible design, the communications apparatus includes a processor. The processor is coupled to a memory, and the memory is configured to store a program. When the program is executed by the processor, the communications apparatus is enabled to perform the clock synchronization method according to any one of the first aspect to the third aspect or the implementations of the first aspect to the third aspect.

In another possible design, the communications apparatus may further be a chip, for example, a chip in a terminal or a chip in an access network device. The chip includes a processing unit, and optionally, further includes a storage unit. The chip may be configured to perform the clock synchronization method according to any one of the first aspect to the third aspect or the implementations of the first aspect to the third aspect.

According to an eighth aspect, this application provides a communications apparatus. The communications apparatus has a function of implementing the session management network element, the data management network element, or the policy control network element in the foregoing method embodiments. The function may be implemented by hardware, or may be implemented by hardware by executing corresponding software. The hardware or the software includes one or more modules corresponding to the foregoing function.

In a possible design, the communications apparatus includes a processor, a memory, a bus, and a communications interface. The memory stores a computer executable instruction, and the processor is connected to the memory through the bus. When the communications apparatus runs, the processor executes the computer executable instruction stored in the memory, so that the communications apparatus performs the method for determining the clock domain according to any one of the fourth aspect to the sixth aspect or the implementations of the fourth aspect to the sixth aspect. For example, the communications apparatus may be a session management network element, a data management network element, or a policy control network element.

In another possible design, the communications apparatus includes a processor. The processor is coupled to a memory, and the memory is configured to store a program. When the program is executed by the processor, the communications apparatus is enabled to perform the method for determining the clock domain according to any one of the fourth aspect to the sixth aspect or the implementations of the fourth aspect to the sixth aspect.

In another possible design, the communications apparatus may further be a chip, for example, a chip in a session management network element, a chip in a data management network element, or a chip in a policy control network element. The chip includes a processing unit, and optionally, further includes a storage unit. The chip may be configured to perform the method for determining the clock domain according to any one of the fourth aspect to the sixth aspect or the implementations of the fourth aspect to the sixth aspect.

According to a ninth aspect, this application provides a storage medium. The storage medium stores a computer program or an instruction. When the computer program or the instruction is executed, a computer is enabled to perform the clock synchronization method according to any one of the first aspect to the third aspect or the implementations of the first aspect to the third aspect.

According to a tenth aspect, this application provides a storage medium. The storage medium stores a computer program or an instruction. When the computer program or the instruction is executed, a computer is enabled to perform the method for determining the clock domain according to any one of the fourth aspect to the sixth aspect or the implementations of the fourth aspect to the sixth aspect.

According to an eleventh aspect, this application provides a computer program product. The computer program product includes a computer software instruction, and the computer software instruction may be loaded by a processor to implement the procedure in the clock synchronization method according to any one of the first aspect to the third aspect.

According to a twelfth aspect, this application provides a computer program product. The computer program product includes a computer software instruction, and the computer software instruction may be loaded by a processor to implement the procedure in the method for determining the clock domain according to any one of the fourth aspect to the sixth aspect.

According to a thirteenth aspect, this application provides a system. The system includes the terminal in the first aspect or any implementation of the first aspect, and the access network device in the second aspect or any implementation of the second aspect.

According to a fourteenth aspect, this application provides a system. The system includes the terminal in the third aspect or any implementation of the third aspect, and the access network device in the second aspect or any implementation of the second aspect.

DESCRIPTION OF EMBODIMENTS

To make the objectives, technical solutions, and advantages of this application clearer, the following further describes this application in detail with reference to the accompanying drawings. A specific operation method in method embodiments may also be used in an apparatus embodiment or a system embodiment. In the descriptions of this application, unless otherwise stated, "a plurality of" means two or more than two.

The architecture and the service scenario described in this application are intended to describe the technical solutions in this application more clearly, and do not constitute a limitation on the technical solutions provided in this application. With the evolution of the network architecture and the emergence of the new service scenarios, the technical solutions provided in this application are also applicable to the similar technical problems.

Figure 1:
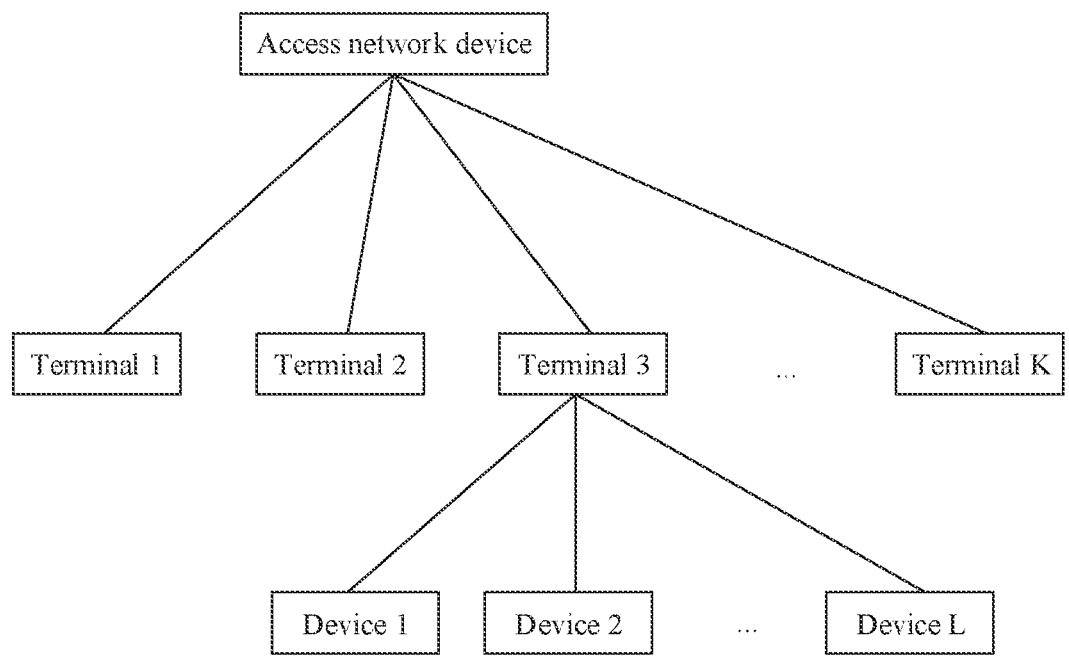
FIG. 1 is a schematic diagram of a possible network architecture according to this application.

FIG. 1 is a schematic diagram of a possible network architecture to which this application is applicable. The network architecture includes an access network device and at least one terminal. The terminal communicates with the access network device through a wireless interface. As shown in the figure, an example in which one access network device is connected to K terminals is used, where K is a positive integer.

The terminal is a device that has a wireless transceiver function, and the terminal may be deployed on the land, including an indoor or outdoor device, a hand-held device, or a vehicle-mounted device, or may be deployed on the water (for example, on a ship), or may be deployed in the air (for example, on a plane, a balloon, or a satellite). The terminal may be a mobile phone, a tablet (pad), a computer having the wireless transceiver function, a virtual reality (VR) terminal, an augmented reality (AR) terminal, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or may include user equipment (UE) and the like. The terminal may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5th generation (5G) network, a terminal device in a future evolved public land mobile network (PLMN), or the like. The terminal sometimes may also be referred to as a terminal device, user equipment (UE), an access terminal device, a vehicle-mounted terminal, an industrial control terminal, a UE unit, a UE station, a mobile station, a mobile console, a remote station, a remote terminal device, a mobile device, a UE terminal device, a terminal device, a wireless communications device, a UE agent, a UE apparatus, or the like. The terminal may also be fixed or movable. This is not limited in this embodiment of this application.

The access network device may also be referred to as a radio access network (RAN) device, and is a device that provides the wireless communication function for the terminal. For example, the access network device includes but is not limited to: a next generation NodeB (g nodeB, gNB) in 5G, an evolved NodeB (eNB), a radio network controller (RNC), a NodeB (NB), a base station controller (BSC), a base transceiver station (BTS), a home base station (for example, a home evolved nodeB, or a home node B, HNB), a baseband unit (BBU), a transmission reception point (TRP), a transmission point (TP), a mobile switching center, and the like. The access network device may alternatively be a radio controller, a centralized unit (CU), and/or a distributed unit (DU) in a cloud radio access network (CRAN) scenario, or the network device may be a relay station, an access point, a vehicle-mounted device, a wearable device, a network device in the future 5G network, a network device in the future evolved PLMN network, or the like. The terminal may communicate with a plurality of access network devices using different technologies. For example, the terminal may communicate with an access network device supporting a long term evolution (LTE) network, or may communicate with an access network device supporting a 5G network, or may support dual connections to an access network device supporting an LTE network and an access network device supporting a 5G network. This is not limited in this embodiment of this application.

The terminal in this application has different types in different application scenarios, which are separately described in the following.

Scenario 1: A terminal connected to an access network device is used as an end station, to be specific, the terminal is not connected to another device, and one terminal corresponds to one clock domain.

Based on this scenario, the terminal may perform clock synchronization with a clock source of a corresponding clock domain by using the access network device. As shown in FIG. 1, a terminal 1 may perform clock synchronization with a clock source of one clock domain.

Scenario 2: A terminal connected to an access network device is not connected to another device, but the terminal includes a plurality of applications. One application may be used as one end station, and one application corresponds to one clock domain.

Based on this scenario, one application of the terminal may perform clock synchronization with a clock source of a clock domain corresponding to the application. Therefore, one terminal supporting a plurality of applications may perform clock synchronization with clock sources of a plurality of clock domains by using the access network device. As shown in FIG. 1, it is assumed that a terminal 2 includes T applications, where T is a positive integer, one application corresponds to one clock domain, and clock sources of different clock domains may be the same or may be different. Therefore, the terminal 2 may perform clock synchronization with clock sources of a maximum of T clock domains.

Scenario 3: A terminal connected to an access network device is connected to one or more other devices, one device may be used as one end station, one device corresponds to one clock domain, and the terminal may also correspond to one clock domain.

Based on this scenario, one device connected to the terminal may perform clock synchronization with a clock source of a clock domain corresponding to the device, and the terminal may also perform clock synchronization with a clock source of one clock domain. Therefore, one terminal connected to one or more other devices may perform clock synchronization with clock sources of a plurality of clock domains by using the access network device. As shown in FIG. 1, a terminal 3 is connected to L devices, where L is a positive integer, one device corresponds to one clock domain, and clock sources of different clock domains may be the same or may be different. Therefore, the terminal 3 may perform clock synchronization with clock sources of a maximum of (L+1) clock domains. For example, in the field of industrial control, one terminal needs to be externally connected to a plurality of industrial devices, such as an industrial robot and a mechanical arm. Therefore, the terminal and the industrial devices externally connected to the terminal need to separately perform clock synchronization with a clock source of a corresponding clock domain.

It should be noted that, in this application, that the terminal is synchronized with the clock source of the clock domain may have different meanings in different application scenarios. For example, it may be understood as that the application of the terminal is synchronized with the clock source of the clock domain, or understood as that the device connected to the terminal is synchronized with the clock source of the clock domain, or understood as that the terminal is synchronized with the clock source of the clock domain.

It should be noted that in this application, there is one clock source in one clock domain, and the clock source may also be referred to as a primary clock source. Therefore, that the terminal performs clock synchronization with a clock source in one clock domain may also be referred to as that the terminal performs clock synchronization with one clock domain, or may also be referred to as that the terminal performs clock synchronization with a primary clock source that is in one clock domain.

Figure 2:
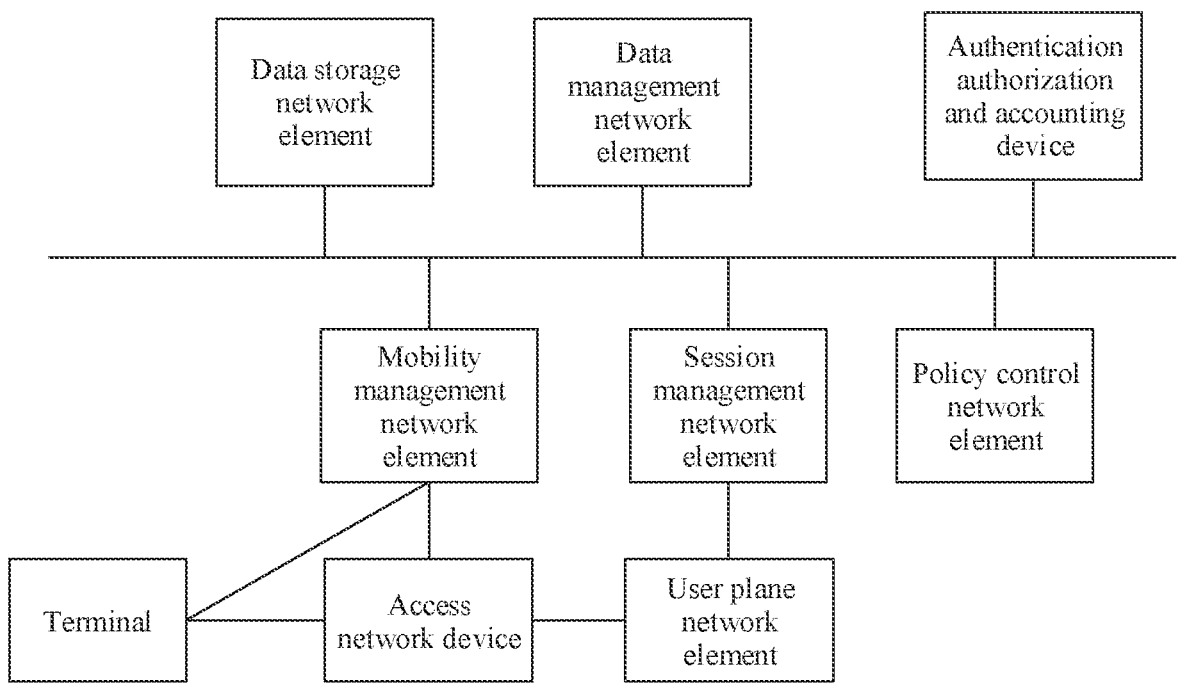
FIG. 2 is a schematic diagram of another possible network architecture according to this application.

FIG. 2 is a schematic diagram of another possible network architecture to which this application is applicable. The network architecture includes a terminal, an access network device, a user plane network element, a mobility management network element, a session management network element, a policy control network element, a data storage network element, a data management network element, and an authentication authorization and accounting device. The terminal and the access network device shown in FIG. 2 may be the terminal and the access network device shown in FIG. 1. For details, refer to related descriptions in FIG. 1.

The user plane network element is mainly responsible for processing a user packet. The processing is, for example, forwarding, charging, or lawful interception. Optionally, the processing may further be receiving data. In a 5G network, the user plane network element may be a user plane function (UPF) network element. In future communications, for example, in a 6th generation (6G) network, the user plane network element may still be a UPF network element, or may have another name. This is not limited in this application.

The session management network element is mainly configured to manage a session in a mobile network, for example, create, modify, or release the session. Specific functions include, for example, allocating an internet protocol (IP) address to a user, selecting a user plane network element that provides a packet forwarding function, generating a forwarding rule, and delivering the forwarding rule to the user plane network element by using signaling. In the 5G network, the session management network element may be a session management function (SMF) network element. In the future communications, for example, in the 6G network, the session management network element may still be an SMF network element, or may have another name. This is not limited in this application.

The mobility management network element is mainly used for registration, mobility management, and a tracking area update procedure for the terminal in the mobile network. The mobility management network element terminates a non-access stratum (NAS) message, completes registration management, connection management, and reachability management, tracking area list (TA list) allocation, mobility management, and the like, and transparently routes a session management (SM) message to the session management network element. In the 5G network, the mobility management network element may be an access and mobility management function (AMF) network element. In the future communication, for example, in the 6G network, the mobility management network element may still be an AMF network element, or may have another name. This is not limited in this application.

The data management network element is mainly configured to manage subscription data, and is responsible for notifying a corresponding network element when the subscription data is modified. In 5G, the data management network element may be a unified data management (UDM) network element. In the future communication, for example, in 6G, the data management network element may still be a UDM network element, or may have another name. This is not limited in this application.

The policy control network element has a user subscription information management function, a policy control function, a charging policy control function, quality of service (QoS) control, and the like. In the 5G network, the policy control network element may be a policy control function (PCF) network element. In the future communication, for example, in the 6G network, the policy control network element may still be a PCF network element, or may have another name. This is not limited in this application.

The authentication authorization and accounting device includes functions such as authentication, authorization, and accounting. The authentication function includes verifying an identity of a user and an available network service. The authorization function includes opening the network service to the user based on an authentication result. The accounting function includes recording usage of various network services by the user and providing the usage to an accounting system. The authentication authorization and accounting device may be located in a 3GPP network, or located in a third-party network. This is not limited in this application. In the 5G network, the authentication authorization and accounting device may be an authentication authorization and accounting (AAA) function network element. In the future communication, for example, in the 6G network, the authentication authorization and accounting device may still be an AAA network element, or may have another name. This is not limited in this application.

A function of the data storage network element includes storing and retrieving subscription information, policy data, common architecture data, and the like, and the data storage network element can be used by the data management network element, the policy control network element, and the like to obtain related data. The data storage network element can provide different data access authentication mechanisms for different types of data such as the subscription information and the policy data, to ensure data access security. The data storage network element should be able to return a failure response with an appropriate cause value for an invalid service operation or data access request. In the 5G network, the data storage network element may be a unified data repository (UDR). In the future communication, for example, in the 6G network, the data repository may still be a UDR, or may have another name. This is not limited in this application.

It may be understood that the foregoing functions may be network elements in a hardware device, software functions running on dedicated hardware, or virtualized functions instantiated on a platform (for example, a cloud platform).

For ease of description, in this application, subsequently, an example in which the terminal is UE, the access network device is a base station, the user plane network element is a UPF network element, the session management network element is an SMF network element, the mobility management network element is an AMF network element, the policy control network element is a PCF network element, the data management network element is a UDM network element, the data storage network element is a UDR, and the authentication authorization and accounting device is an AAA network element is used for description. Further, the UPF network element is referred to as a UPF for short, the session management network element is referred to as an SMF for short, the AMF network element is referred to as an AMF for short, the PCF network element is a PCF, the UDM network element is a UDM, and the AAA network element is AAA. To be specific, the UPF subsequently described in this application may be replaced with the user plane network element, the SMF may be replaced with the session management network element, the AMF may be replaced with the mobility management network element, the UDM may be replaced with the data management network element, the UE may be replaced with the terminal, the UDR may be replaced with the data storage network element, the AAA may be replaced with the authentication authorization and accounting device, and the base station may be replaced with the access network device.

In the conventional technology, one piece of UE can perform clock synchronization only with a clock source that is in one clock domain. However, with development of communications technologies, one piece of UE needs to perform clock synchronization with clock sources of a plurality of clock domains. For example, UE 2 shown in FIG. 1 includes a plurality of applications, and each application needs to perform clock synchronization with a clock source of one clock domain. Therefore, one piece of UE supporting a plurality of applications needs to perform the clock synchronization with clock sources of a plurality of clock domains. For another example, UE 3 shown in FIG. 1 may be connected to a plurality of devices, and each device needs to perform clock synchronization with a clock source of one clock domain. Therefore, one piece of UE connected to a plurality of devices also needs to perform clock synchronization with clock sources of a plurality of clock domains.

Figure 3A:
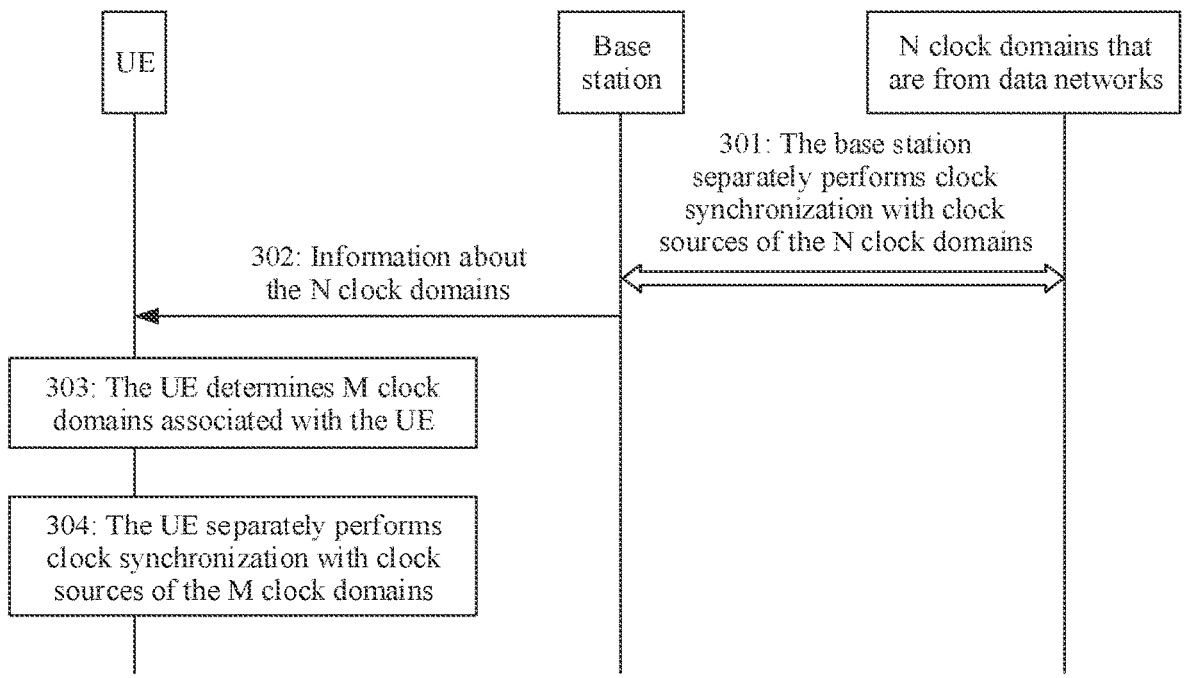
FIG. 3A is a flowchart of a clock synchronization method according to this application.

FIG. 3A shows a clock synchronization method according to this application. The method may be used by one piece of UE to perform clock synchronization with a clock source of one or more clock domains. The method includes the following steps.

Step 301: A base station separately performs clock synchronization with clock sources of N clock domains that are from data networks.

The N clock domains herein may be from N different data networks, and one data network corresponds to one clock domain. Alternatively, the N clock domains may be from X different data networks (X is a positive integer less than N), and one data network corresponds to one or more clock domains. This is not limited in this application.

The data network herein may be, for example, time sensitive networking (TSN), a packet data network, or an enterprise network. This is not limited in this application. The N clock domains herein are a part or all of clock domains supported by the base station. The clock domain corresponding to the data network includes the clock domain supported by the base station, or it is understood as that the clock domain supported by the base station is a subset of the clock domain corresponding to the data network.

Therefore, the base station may perform clock synchronization with the part or all of the clock domains, that is, the foregoing N clock domains, supported by the base station.

Because time systems or time units used by clock domains are not exactly the same, for a same moment, absolute times of different clock domains are not exactly the same.

For example, time systems used by a clock domain 1 and a clock domain 2 are different. The time system used by the clock domain 1 is a coordinated universal time (UTC), and a start time of the UTC is 00:00:00 on Jan. 1, 1972 in a universal time (UT). The time system used by the clock domain 2 is a global positioning system (GPS) time, that is, a GPS atomic time. A time reference of the global positioning system time is 0:00 on Jan. 6, 1980, which is consistent with the coordinated universal time. After that, the time is counted and accumulated based on atomic time second lengths. The difference between the GPS time and the UTC time is an integer multiple of seconds. For example, the difference between the GPS time and the UTC time in 1989 is 5 seconds, the difference between the GPS time and the UTC time in 1996 is 11 seconds, and the difference between the GPS time and the UTC time in 2002 is 13 seconds.

Figure 3B:
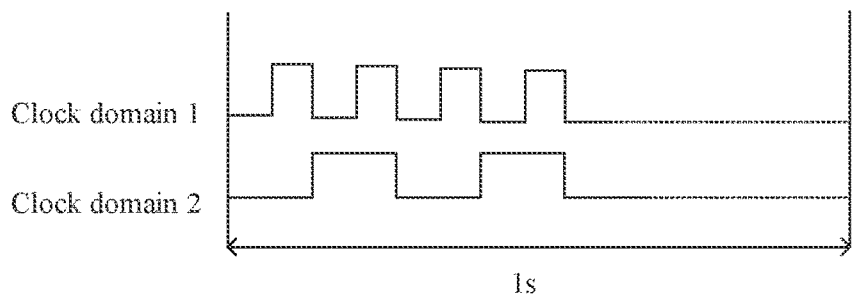
FIG. 3B is a schematic diagram of frequencies of a clock domain 1 and a clock domain 2 according to this application.

For example, FIG. 3B is a schematic diagram of frequencies of a clock domain 1 and a clock domain 2. Time units used by the clock domain 1 and the clock domain 2 are different, so that the frequencies of the clock domain 1 and the clock domain 2 are not synchronized. Frequency synchronization means that different signals have a same quantity of pulses in a same time interval. In the same time interval, the clock domain 1 considers that 1 minute is equal to 60 pulse periodicities, that is, one pulse periodicity is 1 second, the clock domain 2 considers that 1 minute is equal to 30 pulse periodicities, that is, one pulse periodicity is 2 seconds. In other words, because second lengths of the two clock domains are different, that is, time scales are different, as time goes by, a deviation occurs between the two clock domains. In this case, for a same moment, an absolute time 1 of a clock source 1 of the clock domain 1 may be different from an absolute time 2 of a clock source 2 of the clock domain 2.

After the base station separately performs the clock synchronization with the clock sources of the N clock domains, the base station may learn of an absolute time of each clock source. For example, for a current moment, the base station may learn that an absolute time corresponding to the clock source 1 of the clock domain 1 is T1, and an absolute time corresponding to the clock source 2 of the clock domain 2 is T2.

After the base station separately performs the clock synchronization with the clock domains of the N clock domains, the base station is triggered to send information about each clock domain to the UE, or it is understood as that the base station is triggered to indicate the UE to perform clock synchronization with the clock source.

Step 302: The base station sends information about the N clock domains to UE connected to the base station. Correspondingly, the UE may receive the information about the N clock domains, where N is an integer greater than 1.

It should be noted that the base station may send the information about the N clock domains to all UEs connected to the base station, for example, send, in a broadcast manner, the information about the N clock domains to all the UEs connected to the base station. Alternatively, the base station may further send the information about the N clock domains to a part of UEs (for example, UE in a cell or UEs in some cells) connected to the base station, for example, may send, in a multicast or broadcast manner, the information about the N clock domains to the part of UEs connected to the base station.

The information about the clock domain herein includes first time information and a clock domain number of the clock domain. The clock domain number is used to identify the clock domain, and the first time information includes a time of a clock source of the clock domain when the base station sends the information about the clock domain.

Optionally, the time that is of the clock source of the clock domain and that is included in the first time information herein is counted based on a time unit of the clock source, that is, the time that is of the clock source of the clock domain and that is included in the first time information is an absolute time of the clock source.

For example, the base station sends information about two clock domains to the UE:

Information about a first clock domain includes T1 and Number-1.

Information about a second clock domain includes T2 and Number-2.

T1 is first time information of the first clock domain; in other words, T1 is a time of a clock source of the first clock domain when the base station sends the information about the first clock domain to the UE. Number-1 is a clock domain number of the first clock domain. T2 is first time information of the second clock domain; in other words, T2 is a time of a clock source of the second clock domain when the base station sends the information about the second clock domain to the UE. Number-2 is a clock domain number of the second clock domain.

Optionally, information about one clock domain further includes a frequency offset ratio between a local clock of the base station and a clock source of the clock domain. The frequency offset ratio may be used to indicate a cognition difference that is for the time unit and that is between the local clock of the base station and the clock source. For example, the local clock of the base station considers that 1 minute is equal to 60 pulse periodicities, that is, one pulse periodicity is 1 second; the clock source of the first clock domain considers that 1 minute is equal to 60 pulse periodicities. In this case, a frequency offset ratio between the local clock of the base station and the clock source of the first clock domain is 1. For another example, the local clock of the base station considers that 1 minute is equal to 30 pulse periodicities, that is, one pulse periodicity is 2 seconds; the clock source of the second clock domain considers that 1 minute is equal to 60 pulse periodicities. In this case, a frequency offset ratio between the local clock of the base station and the clock source of the second clock domain is 2.

Therefore, in an implementation, if the base station sends information about two clock domains to the UE, the information about the two clock domains may respectively be, for example, the following:

Information about a first clock domain includes: T1, Number-1, and FrequencyRateRatio 1.

Information about a second clock domain includes: T2. Number-2, and FrequencyRateRatio 2.

FrequencyRateRatio 1 is a frequency offset ratio between a local clock of the base station and a clock source of the first clock domain. FrequencyRateRatio 2 is a frequency offset ratio between the local clock of the base station and a clock source of the second clock domain.

In another implementation, if a frequency offset ratio between a local clock of the base station and a clock source of a clock domain is 1, information that is about the clock domain and that is sent by the base station to the UE may not include the frequency offset ratio between the local clock of the base station and the clock source of the clock domain. For example, if FrequencyRateRatio 1=1, information that is about two clock domains and that is sent by the base station to the UE may respectively be the following:

Information about a first clock domain includes T1 and Number-1.

Information about a second clock domain includes: T2, Number-2 and FrequencyRateRatio 2.

For step 302, in specific implementation, the base station may send the information about the clock domain to the UE by using at least the following three different implementation methods.

Implementation method 1: The base station sends broadcast information, so that the UE can receive the broadcast information. The broadcast information includes the information about the N clock domains.

In specific implementation, the broadcast information herein may be, for example, a broadcast message, for example, may be extended based on a system information block 16 (SIB16) message. The SIB16 message includes the information about the N clock domains, and then the SIB16 is sent in a broadcast manner.

For example, the broadcast information is a broadcast message, and N=3. In this case, the broadcast message may include:

```
TimeReferenceInfo information elements
{
time domain number      Number-1,
T T1,
FrequencyRateRatio      FrequencyRateRatio 1,
time domain number      Number-2,
T T2,
FrequencyRateRatio      FrequencyRateRatio 2,
time domain number      Number-3,
T T3,
FrequencyRateRatio      FrequencyRateRatio 3,
}
```

Implementation method 2: The base station sends unicast information to the UE. The unicast information includes the information about the N clock domains.

In the implementation method, the base station sends the unicast information to UE that needs to perform clock synchronization, where the unicast information may be specifically a unicast message, so that the UE can receive the unicast information, and the unicast information includes the information about the N clock domains.

In specific implementation, the unicast information herein may be, for example, a unicast message, and may be specifically extended based on the unicast message. The unicast message includes the information about the N clock domains, and then the unicast message is sent to the UE.

For example, the unicast information is a unicast message, and N=3. In this case, the unicast message may include:

```
TimeReferenceInfo information elements
{
time domain number      Number-1,
T T1,
FrequencyRateRatio      Frequency RateRatio 1,
time domain number      Number-2,
T T2,
FrequencyRateRatio      FrequencyRateRatio 2,
time domain number      Number-3,
T T3,
FrequencyRateRatio      Frequency RateRatio 3,
}
```

Implementation method 3: The base station sends N pieces of unicast information to the UE. One piece of unicast information includes information about one of the N clock domains.

In the implementation method, the base station separately sends the information about the N clock domains to the same UE by using N pieces of unicast, and one piece of unicast information includes information about one clock domain. For example, the first piece of unicast information carries the information about the first clock domain, the second piece of unicast information carries the information about the second clock domain, and so on.

For example, the unicast information is a unicast message, and N=3. In this case, the unicast message 1 may include:

```
TimeReferenceInfo information element 1
{
time domain number      Number-1,
T T1,
FrequencyRateRatio      FrequencyRateRatio 1,
}
```

A unicast message 2 may include:

```
TimeReferenceInfo information element 2
{
time domain number        Number-2,
T T2,
FrequencyRateRatio        FrequencyRateRatio 2,
}
```

A unicast message 3 may include:

```
TimeReferenceinfo information element 3
{
time domain number        Number-3,
T T3,
FrequencyRateRatio        FrequencyRateRatio 3,
}
```

Meanings of the parameters in the implementation method 1 to the implementation method 3 are as follows: Number-1 is a clock domain number of a first clock domain. T1 is first time information of the first clock domain; in other words, T is a time of a clock source of the first clock domain when the base station sends information about the first clock domain to the UE. FrequencyRateRatio 1 is a frequency offset ratio between a local clock of the base station and the clock source of the first clock domain. Number-2 is a clock domain number of a second clock domain. T2 is first time information of the second clock domain; in other words. T2 is a time of a clock source of the second clock domain when the base station sends information about the second clock domain to the UE. FrequencyRateRatio 2 is a frequency offset ratio between the local clock of the base station and the clock source of the second clock domain. Number-3 is a clock domain number of a third clock domain. T3 is first time information of the third clock domain: in other words, T3 is a time of a clock source of the third clock domain when the base station sends information about the third clock domain to the UE. FrequencyRateRatio 3 is a frequency offset ratio between the local clock of the base station and the clock source of the third clock domain.

Step 303: The UE determines M clock domains that are associated with the UE and that are in the N clock domains, where M is a positive integer.

After receiving the information that is about the N clock domains and that is sent by the base station, the UE determines, from the N clock domains, the M clock domains associated with the UE.

Herein, the M clock domains associated with the UE have different meanings for different UEs.

For example, if the UE is the UE in the scenario 1 described in FIG. 1, the M clock domains associated with the UE are a clock domain (that is, M=1) associated with the UE; in other words, the UE may perform clock synchronization with a clock source of one clock domain.

For another example, if the UE is the UE in the scenario 2 described in FIG. 1, the M clock domains associated with the UE are M clock domains respectively associated with M applications that are in the UE, and one application is associated with one clock domain: in other words, one application may perform clock synchronization with a clock source of one clock domain.

For another example, if the UE is the UE in the scenario 3 described in FIG. 1, the M clock domains associated with the UE are a clock domain associated with the UE and (M−1) clock domains respectively associated with (M−1) devices connected to the UE. One device is associated with one clock domain, and the UE is also associated with one clock domain.

A specific implementation method for determining, by the UE, the M clock domains associated with the UE is specifically described subsequently.

Step 304: The UE separately performs clock synchronization with clock sources of the M clock domains based on information about the M clock domains.

After determining the M associated clock domains, for each of the M clock domains, the UE may separately perform clock synchronization with a clock source of the clock domain.

In an example, the following provides an implementation method for the UE to perform clock synchronization with the clock source of the clock domain. Before the base station sends the information about the N clock domains to the UE, the UE implements clock synchronization with the local clock of the base station, and the UE further performs timing advance measurement with the base station to obtain a timing advance value. The timing advance value is used to determine a transmission delay between the UE and the base station. For example, in a random access process, the base station determines the timing advance value by measuring a preamble sequence received from the UE. It should be noted that the timing advance value is calculated by using a time unit of the local clock of the base station as a reference. It may be understood as that frequency synchronization is implemented between a local clock of the UE and the local clock of the base station through timing advance measurement.

On a premise that the UE keeps clock synchronization with the base station and the UE obtains the timing advance value, after the UE receives the information that is about the N clock domains and that is sent by the base station and determines the M clock domains associated with the UE, the UE may separately perform clock synchronization of the clock source with the M clock domains.

For example, for an $i^{th}$ clock domain of the M clock domains, the UE determines second time information of the $i^{th}$ clock domain based on information about the $i^{th}$ clock domain and the timing advance value. The second time information includes a time of a clock source of the $i^{th}$ clock domain when the UE receives the information that is about the $i^{th}$ clock domain and that is sent by the base station, and i ranges from 1 to M. It should be noted that the time that is of the clock source of the clock domain and that is included in the second time information herein is an absolute time of the clock source.

Specifically, the second time information of the $i^{th}$ clock domain=first time information of the $i^{th}$ clock domain+TA/2*FrequencyRateRatio i. The first time information of the $i^{th}$ clock domain is first time information included in the information about the $i^{th}$ clock domain, and TA is a timing advance value. Considering a downlink transmission delay, there is an error in cognition of a reference frame boundary by the base station and the UE. The downlink transmission delay between the base station and the UE may be approximately equal to TA/2. FrequencyRateRatio i is a frequency offset ratio between the local clock of the base station and the clock source of the $i^{th}$ clock domain. TA/2*FrequencyRateRatio i is the downlink transmission delay that is between the base station and the UE and that is represented by using a time unit of the clock source of the $i^{th}$ clock domain. Because the first time information of the $i^{th}$ clock domain is the time of the clock source of the $i^{th}$ clock domain when the base station sends the information about the $i^{th}$ clock domain to the UE, the first time information of the $i^{th}$ clock domain+TA/2*FrequencyRateRatio i is the time of the clock source of the $i^{th}$ clock domain when the UE receives the information about the $i^{th}$ clock domain.

It should be noted that, if the information about the $i^{th}$ clock domain does not carry FrequencyRateRatio i, the UE considers by default that FrequencyRateRatio i=1. Therefore, the second time information of the $i^{th}$ clock domain may be calculated by using the following formula: the second time information of the $i^{th}$ clock domain=the first time information of the $i^{th}$ clock domain+TA/2.

After the UE obtains second time information of one clock domain through calculation, the UE may calculate an absolute time of a local clock of the clock domain at any moment based on the second time information, to implement clock synchronization with a clock source of the clock domain. Alternatively, it may be understood as that the UE calculates, based on an absolute time indicated by second time information of a clock domain, other absolute times before and after the absolute time, to implement clock synchronization with a clock source of the clock domain.

For example, in an implementation, if in step 302, after the base station performs clock synchronization with the clock source of the clock domain, the base station sends the information about the N clock domains to the UE by using the broadcast information. In this case, first time information included in information about one clock domain may be a time of a frame tail boundary of a frame in which a system information window (SI-Window) is located, and the broadcast message is located in the system information window. The time of the frame tail boundary corresponds to the absolute time of the clock source of the clock domain. In this case, after obtaining second time information of the clock domain through calculation, the UE obtains an absolute time of the clock domain. Further, in step 302, the UE obtains FrequencyRateRatio i, that is, the frequency offset ratio between the local clock of the base station and the clock source of the $i^{th}$ clock domain. Because frequency synchronization has been performed between the local clock of the UE and the local clock of the base station, the UE may obtain a frequency offset ratio between the local clock of the UE and the clock source of the $i^{th}$ clock domain based on FrequencyRateRatio i. For example, FrequencyRateRatioUE i may be used to represent the frequency offset ratio between the local clock of the UE and the clock source of the $i^{th}$ clock domain, where FrequencyRateRatioUE i is equal to FrequencyRateRatio i.

So far, the UE obtains the following information:

1. The second time information of the $i^{th}$ clock domain, that is, an absolute time of a local clock of the $i^{th}$ clock domain.

2. FrequencyRateRatioUE i, that is, the frequency offset ratio between the local clock of the UE and the clock source of the $i^{th}$ clock domain.

The UE may calculate the absolute time of the local clock of the clock domain at any moment based on the second time information of the $i^{th}$ clock domain. Therefore, clock synchronization is kept between the UE and the clock source.

For another example, in another implementation, if in step 302, after the base station performs clock synchronization with the clock source of the clock domain, the base station sends the information about the N clock domains to the UE by using the unicast information, the unicast information may further include a reference frame number. In this case, first time information included in information about one clock domain may be a time that is recorded by a clock source of the clock domain and that is of a frame tail boundary of a reference frame indicated for the reference frame number, and the time of the frame tail boundary corresponds to an absolute time of the clock source of the clock domain. In this case, after obtaining second time information of the clock domain through calculation, the UE obtains an absolute time of the clock domain. The UE may calculate an absolute time of a local clock of the clock domain at any moment based on the second time information of the $i^{th}$ clock domain. Therefore, clock synchronization is kept between the UE and the clock source.

Figure 3C:
FIG. 3C is a schematic diagram of changes of a local clock of a terminal and a local clock of an $i^{th}$ clock domain according to this application.

For example, FIG. 3C is a schematic diagram of changes of a local clock of UE and a local clock of an $i^{th}$ clock domain according to this application. The UE may obtain FrequencyRateRatioUE i, that is, the frequency offset ratio between the local clock of the UE and the clock source of the $i^{th}$ clock domain, through calculation. For example, according to the foregoing method, when the UE is synchronized with the $i^{th}$ clock source, the local clock of the $i^{th}$ clock domain is T1, and the UE may obtain, through calculation, that the local clock of the $i^{th}$ clock domain is T1; when the local clock source of the $i^{th}$ clock domain is T1, the local clock of the UE is T2. In this case, starting from the moment T2, the UE may obtain, through calculation, the local clock that is of the $i^{th}$ clock source and that is obtained through calculation by the UE based on the local clock of the UE at any moment. In this case synchronization between the UE and the clock source of the $i^{th}$ clock domain is implemented. For example, when the local clock of the UE is T3 (herein, T3 is any moment after T2), assuming that the local clock of the $i^{th}$ clock domain is T4, the following relationship is established: $(T3-T2)/(T4-T1)$=FrequencyRateRatioUE i. Therefore, the UE may obtain, through calculation, that the local clock T4 of the $i^{th}$ clock domain=$(T3-T2)$/FrequencyRateRatioUE i+T1. In other words, the UE may obtain the local clock T4 of the $i^{th}$ clock domain through calculation based on any moment T3 that is after the local clock T2 of the UE, that is, clock synchronization between the UE and the clock source of the $i^{th}$ clock domain is implemented.

It should be noted that, if the information about the $i^{th}$ clock domain does not carry FrequencyRateRatio i, the UE considers by default that FrequencyRateRatio i=1, that is, FrequencyRateRatioUE i=, and the UE may obtain, through calculation, that the local clock T4 of the $i^{th}$ clock domain=T3−T2+T1.

According to the foregoing method, clock synchronization between one piece of UE and clock sources of a plurality of clock domains associated with the UE is implemented, and efficiency of performing clock synchronization by the UE is improved.

Figure 4:
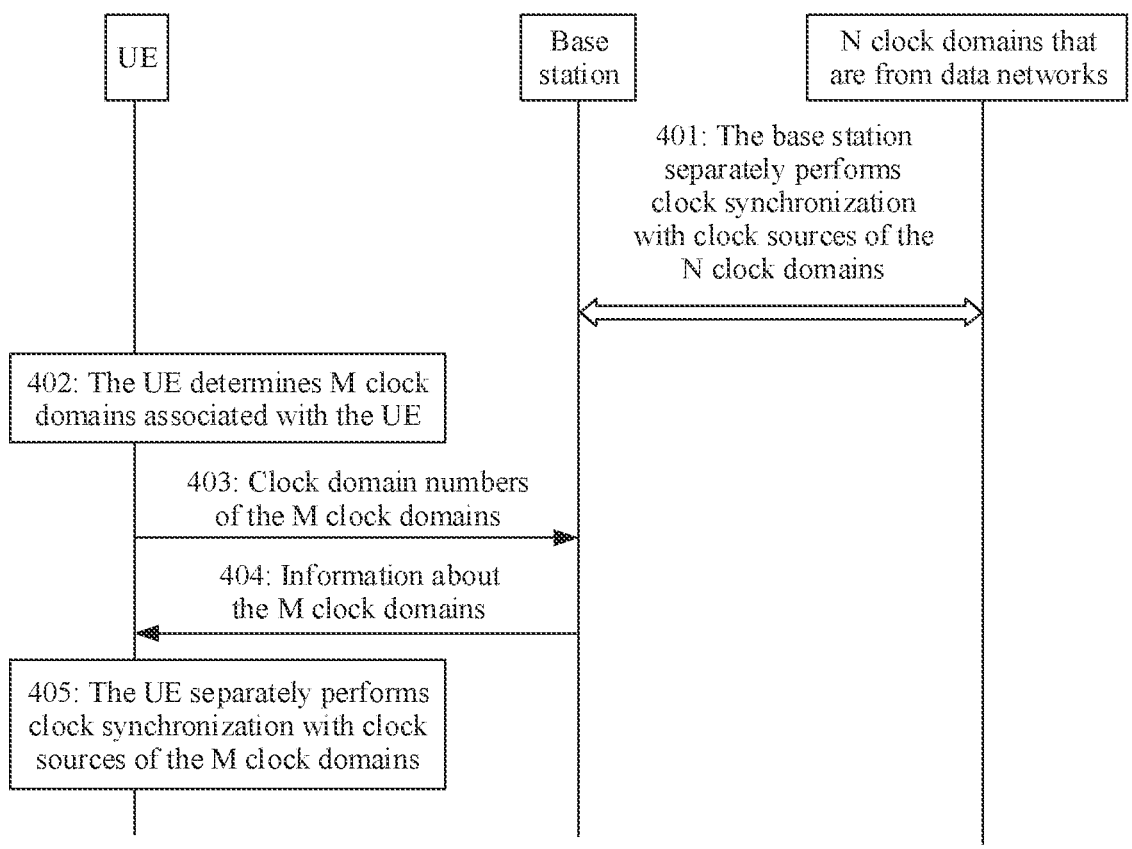
FIG. 4 is a flowchart of another clock synchronization method according to this application.

FIG. 4 shows another clock synchronization method according to this application. The method may be used by one piece of UE to perform clock synchronization with a clock source of one or more clock domains. The method includes the following steps.

Step 401: A base station separately performs clock synchronization with clock sources of N clock domains that are from data networks.

The step is the same as step 301 in the embodiment shown in FIG. 3A. For details, refer to the foregoing descriptions. Details are not described herein again.

It should be noted that, in step 401 in this embodiment, after the base station performs the clock synchronization with the clock source of the clock domain that is from the data network, the base station is not triggered to actively send information about the N clock domains to the UE.

Step 402: The UE determines M associated clock domains, where M is a positive integer.

The step is the same as step 303 in the embodiment shown in FIG. 3A. For details, refer to the foregoing. Details are not described herein again.

It should be noted that when the UE determines that clock synchronization needs to be performed, the UE may be triggered to perform step 402 and subsequent steps.

Step 403: The UE sends, to the base station, clock domain numbers of the M clock domains associated with the UE.

In an implementation, the UE may send a request message to the base station. The request message includes the clock domain numbers of the M clock domains associated with the UE, and the request message is used to request to obtain information about the M clock domains.

Step 404: The base station sends, to the UE, the information about the M clock domains corresponding to M clock domain numbers. Correspondingly, the UE may receive the information about the M clock domains.

It should be noted that the base station may obtain the information about the N clock domains by using step 401 and locally store the information. The information about the N clock domains herein includes the information that is about the M clock domains and that is requested by the UE. Therefore, the base station may send, to the UE based on the request of the UE, the information about the M clock domains corresponding to the M clock domain numbers.

It should be noted that, for specific content of the information that is about the M clock domains and that is sent by the base station in step 404, refer to the related descriptions in step 302. In addition, for a specific implementation method (including broadcast sending and unicast sending) for sending the information about the M clock domains by the base station, refer to the related descriptions in the foregoing step 302. Details are not described herein again.

Step 405: The UE separately performs clock synchronization with clock sources of the M clock domains based on the information about the M clock domains.

A specific implementation method of the step is the same as that of step 304. For details, refer to the foregoing descriptions.

According to the foregoing method, clock synchronization between one piece of UE and clock sources of a plurality of clock domains associated with the UE is implemented, and efficiency of performing clock synchronization by the UE is improved.

A main difference between the embodiment shown in FIG. 4 and the embodiment shown in FIG. 3A is: In the embodiment shown in FIG. 4, the base station sends, to UE based on the request of the UE, information that is about a clock domain and that is requested by the UE. However, in the embodiment shown in FIG. 3A, the base station sends, to the UE, information about a part or all of clock domains supported by the base station, and then the UE determines, from the information, information about a clock domain associated with the UE. In specific implementation, a corresponding execution method may be selected based on an actual requirement.

It should be noted that, in an alternative implementation, step 402 and step 403 in the embodiment shown in FIG. 4 may also be replaced with the following step A and step B.

Step A: A core network element determines clock domain numbers of M clock domains associated with the UE.

Figure 5:
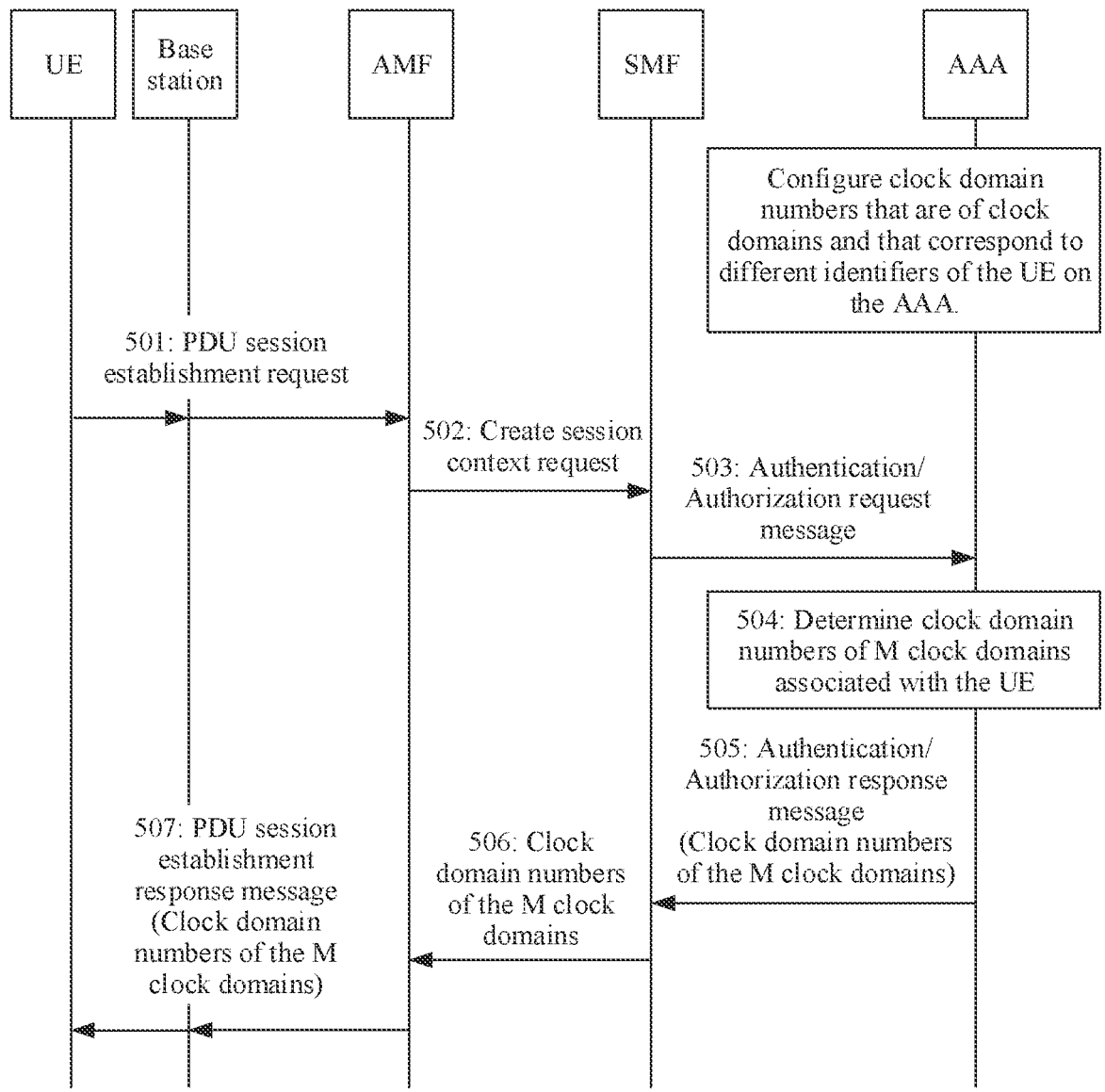
FIG. 5 is a flowchart of a method for determining a clock domain associated with a terminal according to this application.
Figure 6:
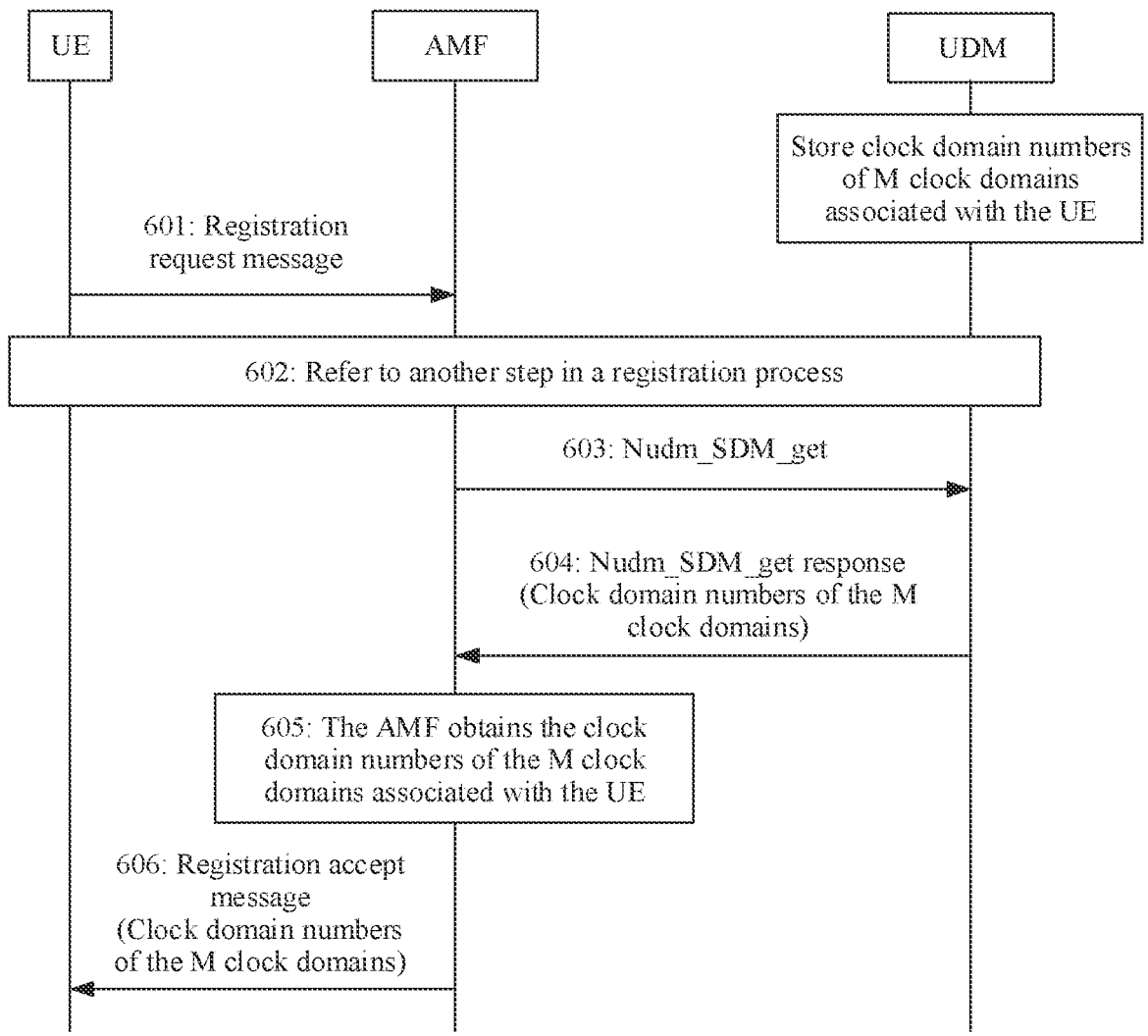
FIG. 6 is a flowchart of another method for determining a clock domain associated with a terminal according to this application.
Figure 7:
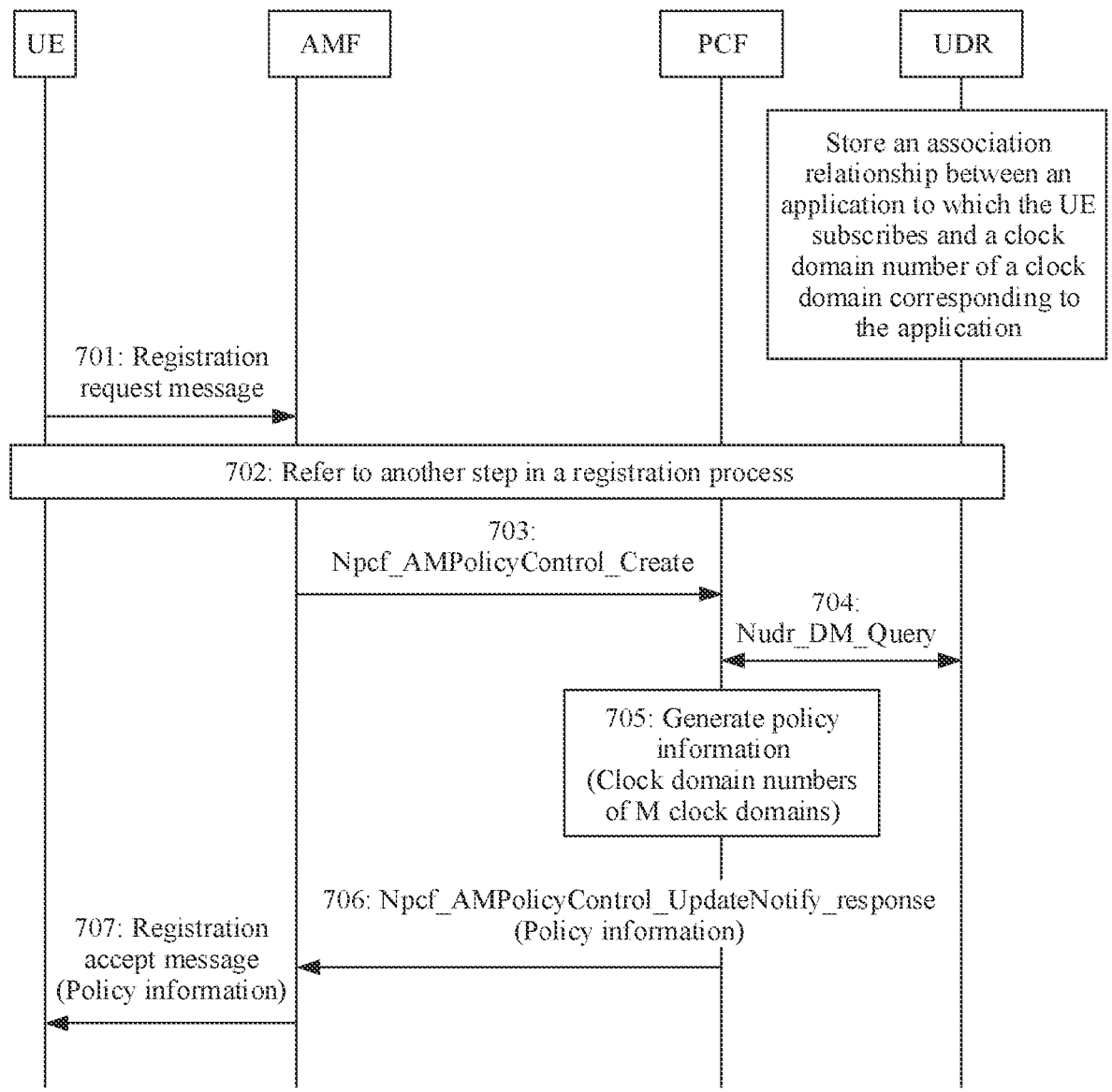
FIG. 7 is a flowchart of another method for determining a clock domain associated with a terminal according to this application.

For example, the core network element (such as an SMF, a PCF, or a UDM) obtains, by using the method in any one of the following embodiments in FIG. 5 to FIG. 7, the clock domain numbers of the M clock domains associated with the UE.

Step B: The core network element sends, to the base station by using an AMF, the clock domain numbers of the M clock domains associated with the UE.

After obtaining the clock domain numbers of the M clock domains associated with the UE, the core network element sends, to the base station by using the AMF, the clock domain numbers of the M clock domains associated with the UE, to trigger the base station to send, to the UE, information about the M clock domains associated with the UE, so that the UE performs clock synchronization.

A difference between the alternative method and the embodiment shown in FIG. 4 lies in that the core network element triggers the base station to send, to the UE, the information about clock domains of the M clock domains associated with UE, so that the UE performs clock synchronization.

The following provides several different implementation methods for step 303 in the embodiment shown in FIG. 3A or step 402 in the embodiment shown in FIG. 4. That is, a specific implementation method for determining, by the UE, the M clock domains associated with the UE is provided.

Implementation method 1: in a procedure of establishing a session, the UE obtains, from a core network element, the M clock domains associated with the UE. The core network element stores an association relationship between an identifier of the UE and the clock domain numbers of the M clock domains. The identifier of the UE includes one or more of the following: a generic public subscription identifier (GPSI) of the UE, an IP address associated with the session, and at least one medium access control (MAC) address associated with the UE. The core network element herein may be AAA or an SMF.

For example, in the procedure of establishing the session, the UE sends a session request message to the SMF, the SMF sends an authentication authorization request message to the AAA. The authentication authorization request message includes the identifier of the UE, and then the AAA obtains the clock domain numbers that are of the M clock domains and that correspond to the identifier of the UE. The AAA sends the clock domain numbers of the M clock domains to the SMF. Then, the SMF sends the clock domain numbers of the M clock domains to the UE. Therefore, the UE may obtain the clock domain numbers of the M clock domains associated with the UE.

A specific implementation procedure of the implementation method is provided below with reference to FIG. 5. FIG. 5 shows a method for determining a clock domain associated with a terminal according to this application.

Clock domain numbers that are of clock domains and that correspond to different identifiers of UE are configured on AAA that is in an external network. The identifier of the UE may be, for example, one or more of an IP address, a MAC address, and a GPSI.

For example, a clock domain number corresponding to the MAC address is configured on the AAA. In this case, information configured on the AAA may be shown in a table 1.

TABLE 1

| MAC Address | Information about a clock domain corresponding to the MAC address |
|---|---|
| MAC address-1: 00-50-BA-CE-07-0C | Clock domain number-1 |
| MAC address-2: 00-50-BA-CE-07-1C | Clock domain number-2 |

TABLE 1-continued

| MAC Address | Information about a clock domain corresponding to the MAC address |
|---|---|
| MAC address-3: 00-50-BA-CE-07-2C | Clock domain number-2 |
| MAC address-4: 00-50-BA-CE-07-3C | Clock domain number-3 |

Alternatively, a clock domain number corresponding to a MAC address segment may be further configured on the AAA, and one MAC address segment includes a plurality of MAC addresses. In this case, information configured on the AAA may be shown in a table 2.

TABLE 2

| MAC address segment | Information about a clock domain corresponding to the MAC address |
|---|---|
| MAC address-range-1: 00-50-BA-CE-07-00~00-50-BA-CE-08-00 | Clock domain number-1 |
| MAC address-range-2: 00-50-BA-CE-08-01~00-50-BA-CE-09-00 | Clock domain number-2 |
| MAC address-range-3: 00-50-BA-CE-09-01~00-50-BA-CE-10-00 | Clock domain number-3 |
| MAC address-range-3: 00-50-BA-CE-10-01~00-50-BA-CE-11-00 | Clock domain number-4 |

The method shown in FIG. 5 includes the following steps.

Step 501: The UE initiates a protocol data unit (PDU) session establishment request.

Optionally, the PDU session establishment request carries parameters such as a PDU session identifier, single network slice selection assistance information (S-NSSAI), a data network name (DNN), and a session management (SM) PDU DN request container. The SM PDU DN request container is used to perform PDU session authentication with the external network.

Step 502: An AMF sends a create session context request to an SMF.

After receiving the PDU session establishment request from the UE, the AMF selects the SMF, and sends the create session context request to the SMF. For example, the AMF may request, by invoking a Nsmf_PDUSession_CreateSM-Context Request service operation of the SMF, the SMF to create a session context for the UE.

Step 503: The SMF sends an authentication/authorization request message to the AAA.

Optionally, the request message may carry the SM PDU DN request container and the GPSI of the UE, and the SM PDU DN request container may include the PDU session identifier.

Step 504: The AAA executes an authentication/authorization procedure of PDU session establishment. If the authentication succeeds, the AAA determines, based on the identifier of the UE, clock domain numbers of M clock domains associated with the UE.

For example, the AAA may determine, based on the GPSI of the UE, a MAC address corresponding to the UE, and then obtain, by searching the foregoing table 1 or table 2, a clock domain number corresponding to the MAC address.

It should be noted that the MAC address corresponding to the UE herein has different meanings in different application scenarios.

For example, for the scenario 1 in the embodiment shown in FIG. 1, if one piece of UE is not associated with another device, and the UE corresponds to one clock domain, the MAC address corresponding to the UE herein is a MAC address of the UE. Therefore, the UE may obtain, from the AAA, a clock domain number of a clock domain corresponding to the UE.

For another example, for the scenario 3 in the embodiment shown in FIG. 1, if one piece of UE is associated with another device, the MAC address corresponding to the UE herein is a MAC address of the UE and a MAC address of the another device associated with the UE. Therefore, the UE may obtain, from the AAA, a clock domain number of a clock domain corresponding to the UE, and obtain a clock domain number of a clock domain corresponding to the another device associated with the UE.

Step 505: The AAA sends an authentication/authorization response message to the SMF, where the response message carries the clock domain numbers of the M clock domains associated with the UE.

Step 506: The SMF sends, to the AMF, the clock domain numbers of the M clock domains associated with the UE.

For example, the SMF may send, to the AMF by using a Namf_Communication_N1N2MessageTransfer message, the clock domain numbers of the M clock domains associated with the UE.

Step 507: The AMF sends a PDU session establishment response message to the UE, where the response message includes the clock domain numbers of the M clock domains associated with the UE.

According to the method shown in FIG. 5, the UE may obtain, from the AAA or the SMF in a procedure of establishing a session, the clock domain numbers of the M clock domains associated with the UE.

It should be noted that the foregoing is described by using an example in which the AAA stores a correspondence between a MAC address (or a MAC address segment) and a clock domain number of a clock domain. In another implementation, the AAA may also store a correspondence between an IP address and a clock domain number of a clock domain, so that the AAA can send, to the UE based on an IP address of a session that the UE requests to establish, a clock domain number that is of a clock domain and that corresponds to the IP address. Alternatively, the AAA stores a correspondence between a GPSI and a clock domain number of a clock domain, so that the AAA can send, to the UE based on the GPSI of the UE, a clock domain number that is of a clock domain and that corresponds to the GPSI.

Implementation method 2: The UE obtains, from a core network element, the M clock domains associated with the UE. The core network element stores an association relationship between subscription information of the UE and the clock domain numbers of the M clock domains associated with the UE: or the core network element stores subscription information of the UE, and the subscription information includes the clock domain numbers of the M clock domains. The core network element includes a UDM or a PCF.

For example, in an implementation, the UDM stores an association relationship between the subscription information of the UE and the clock domain numbers of the M clock domains associated with the UE: or the UDM stores the subscription information of the UE, and the subscription information includes the clock domain numbers of the M clock domains. In a registration procedure of the UE, the UDM obtains the subscription information of the UE, determines, based on the subscription information of the UE, the clock domain numbers of the M clock domains associated with the UE, and then sends the clock domain numbers of the M clock domains to the UE.

For the implementation, the following provides a specific implementation process with reference to FIG. 6. FIG. 6 shows a method for determining a clock domain associated with a terminal according to this application.

In an implementation method, the method may be applied to the scenario 1 of the embodiment shown in FIG. 1. In this case, a network management system (Operation, Administration and Maintenance, OAM) may determine, in advance based on a device type of UE, a clock domain to which the UE belongs, and then generate a clock domain number for the UE and store the clock domain number in a UDM. For example, subscription information of the UE may be stored in the UDM, and the subscription information of the UE includes the clock domain number, or an association relationship between the subscription information of the UE and the clock domain number is stored in the UDM.

In another implementation method, the method may be further applied to the scenario 3 of the embodiment shown in FIG. 1. In this case, an OAM may determine, in advance based on a device type of UE and a device type of a device connected to the UE, a clock domain to which the UE belongs and a clock domain to which the device connected to the UE belongs, generate a clock domain number for the UE, and then generate a clock domain number for the device connected to the UE, and store the clock domain number in a UDM. For example, subscription information of the UE may be stored in the UDM, and the subscription information of the UE includes the clock domain number to which the UE belongs and the clock domain number to which the device connected to the UE belongs: or subscription information of the UE is stored in the UDM, an association relationship between the clock domain number to which the UE belongs and the clock domain number to which the device connected to the UE belongs.

The embodiment shown in FIG. 6 includes the following method steps.

Step 601: The UE initiates a registration procedure, and sends a registration request message to an AMF.

The message carries an identifier of the UE.

For step 602, refer to another step in the registration procedure.

For example, after receiving the registration request of the UE, the AMF may initiate a security procedure to authenticate the UE. In addition, other steps are further included. For details, refer to related descriptions in the conventional technology.

Step 603: The AMF invokes a Nudm_SDM_get service operation of the UDM, to request to obtain the subscription information of the UE.

Optionally, before step 603, the AMF may further invoke a Nudm_UECM_Registration service operation of the UDM, to trigger the UDM to store an association relationship between an identifier of the AMF and the identifier of the UE.

Step 604: The UDM returns, to the AMF by using a Nudm_SDM_get acknowledgment (ACK), clock domain numbers of M clock domains associated with the UE.

In an implementation, if the UDM stores an association relationship between the subscription information of the UE and the clock domain numbers of the M clock domains associated with the UE, step 604 may be specifically implemented as follows: The UDM sends, to the AMF, the subscription information of the UE and clock domain numbers of M clock domains associated with the UE.

In another implementation, if the UDM stores the subscription information of the UE, and the subscription information includes the clock domain numbers of the M clock domains, step 604 may be specifically implemented as follows: The UDM sends the subscription information of the UE to the AMF, and the subscription information includes clock domain numbers of M clock domains associated with the UE.

Step 605: The AMF obtains the clock domain numbers of the M clock domains associated with the UE.

Step 606: The AMF sends a registration accept message to the UE, where the message carries the clock domain numbers of the M clock domains associated with the UE.

According to the embodiment shown in FIG. 6, the UE may obtain, from the UDM in the registration procedure, the clock domain numbers of the M clock domains associated with the UE.

For another example, in another implementation, the PCF may obtain the subscription information of the UE from a UDR. The subscription information includes an application to which the UE subscribes, and the PCF determines the clock domain numbers of M clock domains corresponding to the application to which the UE subscribes. Then, the PCF generates policy information, and the policy information includes the clock domain numbers of the M clock domains corresponding to the application to which the UE subscribes. Then, the PCF sends the policy information to the UE.

For example, an association relationship that is stored in the UDR and that is between the application to which the UE subscribes and the clock domain number of the clock domain may be shown in a table 3.

TABLE 3

| Identifier of an application | Clock domain number of a clock domain corresponding to the application |
|---|---|
| Application-1 | Number-1 |
| Application-2 | Number-2 |
| Application-3 | Number-2 |
| Application-4 | Number-3 |

For the implementation, the following provides a specific implementation process with reference to FIG. 7. FIG. 7 shows a method for determining a clock domain associated with a terminal according to this application. The method may be applied to the scenario 2 of the embodiment shown in FIG. 1, to be specific, UE includes M applications, and one application is associated with one clock domain.

The method includes the following steps.

Step 701: The UE initiates a registration procedure, and sends a registration request message to an AMF.

The message carries an identifier of the UE.

For step 702, refer to another step in the registration procedure.

For example, after receiving the registration request of the UE, the AMF may initiate a security procedure to authenticate the UE. In addition, other steps are further included. For details, refer to related descriptions in the conventional technology.

Step 703. If the AMF does not locally store an access and mobility management policy related to the UE, the AMF performs an access and mobility policy association establishment (AM Policy Association Establishment) procedure, and the AMF invokes a Npcf_AMPolicyControl_Create service operation of a PCF, where the operation carries information such as a permanent identifier (SUPI) of the UE, subscription notification indication, and an external identifier (GPSI) of the UE.

The step is an optional step.

Step 704: The PCF invokes a Nudr_DM_Query service operation (carrying the SUPI) of the UDR. The UDR returns information about an application to which the UE subscribes, policy data. UE context policy control data, and the like to the PCF.

Step 705: The PCF generates policy information for the UE, where the policy information includes clock domain numbers of M clock domains corresponding to the application to which the UE subscribes.

For example, applications to which the UE subscribes are Application-1 and Application-3, and according to the table 3, the PCF may determine that clock domain numbers corresponding to Application-1 and Application-3 are Number-1 and Number-2 respectively.

Step 706: The PCF invokes a Npcf_AMPolicyControl_response service operation, and sends the policy information to the AMF, where the policy information includes the clock domain numbers of the M clock domains corresponding to the application to which the UE subscribes.

Step 707: The AMF sends a registration accept message to the UE, where the registration accept message includes the policy information, and the policy information includes the clock domain numbers of the M clock domains corresponding to the application to which the UE subscribes.

According to the embodiment, the PCF generates the policy information for the UE, where the UE determines, by using the policy information, the clock domain numbers of the M clock domains corresponding to the application to which the UE subscribes.

The foregoing mainly describes the solutions provided in this application from a perspective of interaction between network elements. It may be understood that to implement the foregoing functions, each network element includes a corresponding hardware structure and/or software module for implementing each function. A person of ordinary skill in the art should easily be aware that, in combination with the examples described in the embodiments disclosed in this specification, units and algorithm steps may be implemented by hardware or a combination of hardware and computer software in the present invention. Whether a function is executed by hardware or hardware driven by computer software depends on particular applications and design constraints of the technical solutions. A person skilled in the art may use different methods to implement the described functions for each particular application, but it should not be considered that the implementation goes beyond the scope of the present invention.

Figure 8:
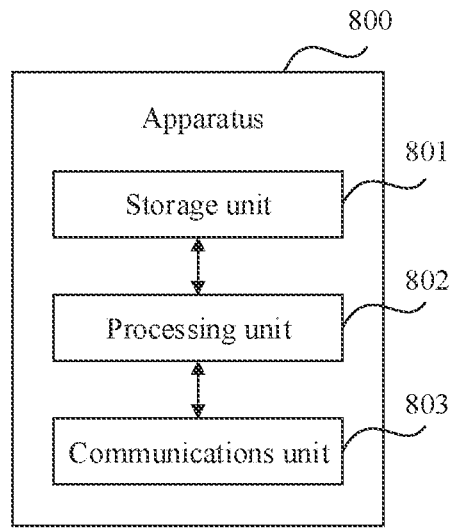
FIG. 8 is a schematic diagram of an apparatus according to this application.

When an integrated unit is used, FIG. 8 is a possible example block diagram of an apparatus according to an embodiment of the present invention. The apparatus 800 may exist in a form of software, or may exist in a form of hardware, or may exist in a form of software and hardware. This is not limited in this embodiment of this application. The apparatus 800 may include a processing unit 802 and a communications unit 803. In an implementation, the communications unit 803 may include a receiving unit and/or a sending unit. The processing unit 802 is configured to control and manage the apparatus 800. The communications unit 803 is configured to support the apparatus 800 in communicating with another network entity. The apparatus 800 may further include a storage unit 801, configured to store program code and data of the apparatus 800.

The processing unit 802 may be a processor or a controller, for example, may be a general purpose central processing unit (CPU), a general purpose processor, a digital signal processor (DSP), an application-specific integrated circuit (ASIC), a field programmable gate array (FPGA), or another programmable logic device, a transistor logic device, a hardware component, or any combination thereof. The processing unit 802 may implement or execute various example logical blocks, modules, and circuits described with reference to content disclosed in this embodiment of the present invention. The processor may be a combination of processors implementing a computing function, for example, a combination including one or more microprocessors, or a combination of the DSP and a microprocessor. The communications unit 803 may be a communications interface, a transceiver, a transceiver circuit, or the like, where the communications interface is a general name, and may include a plurality of interfaces during specific implementation. The storage unit 801 may be a memory.

In a first application, the apparatus 800 may be the access network device in any one of the foregoing embodiments, or may be a chip in the access network device. For example, when the apparatus 800 is the access network device, the processing unit 802 may be, for example, a processor, the communications unit may be, for example, a transceiver, and the transceiver includes a radio frequency circuit. Optionally, the storage unit may be, for example, a memory. For example, when the apparatus 800 is the chip in the access network device, the processing unit 802 may be, for example, a processor, and the communications unit may be, for example, an input/output interface, a pin, a circuit, or the like. The processing unit 802 may execute a computer executable instruction stored in the storage unit. Optionally, the storage unit is a storage unit in the chip, such as a register or a cache. The storage unit may further be a storage unit, such as a read-only memory (ROM) or another type of static storage device that can store static information and an instruction, and a random access memory (RAM), that is outside the chip and that is in the access network device.

Specifically, when the communications unit 803 includes the sending unit and the receiving unit, the processing unit is configured to separately perform clock synchronization with clock sources of the N clock domains. The sending unit is configured to: after the processing unit completes the clock synchronization with the clock source of the N clock domains, send information about the N clock domains to a terminal. Information about one clock domain includes first time information and a clock domain number of the clock domain, the first time information includes a time of a clock source of the clock domain when the access network device sends the information about the clock domain, the clock domain number is used to identify the clock domain, and N is an integer greater than 1.

In a possible implementation, the information about the clock domain further includes a frequency offset ratio between a local clock of the access network device and the clock source of the clock domain.

In a possible implementation, the sending unit is specifically configured to: send broadcast information, where the broadcast information includes the information about the N clock domains; or send unicast information to the terminal, where the unicast information includes the information about the N clock domains; or send N pieces of unicast information to the terminal, where one piece of unicast information includes information about one of the N clock domains.

In a possible implementation, the receiving unit is configured to: before the sending unit sends the information about the N clock domains to the terminal, receive clock domain numbers that are of the N clock domains and that are sent by the terminal or a core network element.

In a second application, the apparatus 800 may be the terminal in any one of the foregoing embodiments, or may be a chip in the terminal. For example, when the apparatus 800 may be the terminal, the processing unit 802 may be, for example, a processor, the communications unit may be, for example, a transceiver, and the transceiver includes a radio frequency circuit. Optionally, the storage unit may be, for example, a memory. For example, when the apparatus 800 may be the chip in the terminal, the processing unit 802 may be, for example, a processor, and the communications unit may be, for example, an input/output interface, a pin, a circuit, or the like. Optionally, the storage unit is a storage unit in the chip, for example, a register or a cache. The storage unit may further be a storage unit, such as a ROM, another type of static storage device that can store static information and an instruction, or a RAM, that is outside the chip and that is in the terminal.

Specifically, when the communications unit 803 includes the sending unit and the receiving unit, in a first embodiment, the receiving unit is configured to receive information that is about N clock domains and that is sent by an access network device. Information about one clock domain includes first time information and a clock domain number of the clock domain, the first time information includes a time of a clock source of the clock domain when the access network device sends the information about the clock domain, the clock domain number is used to identify the clock domain, and N is an integer greater than 1. The processing unit is configured to: determine M clock domains associated with an apparatus in the N clock domains, where M is a positive integer; and separately perform clock synchronization with clock sources of the M clock domains based on information about the M clock domains.

In a possible implementation, the information about the clock domain further includes a frequency offset ratio between a local clock of the access network device and the clock source of the clock domain.

In a possible implementation, the receiving unit is specifically configured to: receive broadcast information sent by the access network device, where the broadcast information includes the information about the N clock domains; or receive unicast information sent by the access network device, where the unicast information includes the information about the N clock domains: or receive N pieces of unicast information sent by the access network device, where one piece of unicast information includes information about one of the N clock domains.

In a possible implementation, that the processing unit is configured to determine the M clock domains that are associated with the terminal and that are in the N clock domains specifically includes: in a procedure of establishing a session, obtaining, from a core network element, the clock domain numbers of the M clock domains associated with the terminal. The core network element stores an association relationship between an identifier of the terminal and the clock domain numbers of the M clock domains. The identifier of the terminal includes one or more of the following: a GPSI of the terminal, an IP address associated with the session, and at least one MAC address associated with the terminal.

In a possible implementation, that the processing unit is configured to determine the M clock domains that are associated with the terminal and that are in the N clock domains specifically includes: obtaining, from a core network element, the clock domain numbers of the M clock domains associated with the terminal. The core network element includes a data management network element or a policy control network element. The core network element stores an association relationship between subscription information of the terminal and the clock domain numbers of the M clock domains associated with the terminal; or the core network element stores subscription information of the terminal, and the subscription information includes the clock domain numbers of the M clock domains.

In a possible implementation, the processing unit is further configured to: before the receiving unit receives the information that is about the N clock domains and that is sent by the access network device, perform timing advance measurement with the access network device to obtain a timing advance value, where the timing advance value is a transmission delay between the terminal and the access network device.

In a possible implementation, that the processing unit is configured to perform the clock synchronization with the clock sources of the M clock domains based on the information about the M clock domains specifically includes: for an $i^{th}$ clock domain of the M clock domains, determining second time information of the $i^{th}$ clock domain based on information about the $i^{th}$ clock domain and the timing advance value. The second time information includes a time of a clock source of the $i^{th}$ clock domain when the terminal receives the information that is about the $i^{th}$ clock domain and that is sent by the access network device, and i ranges from 1 to M.

In a second embodiment, the sending unit is configured to send, to an access network device, clock domain numbers of M clock domains associated with a terminal, where M is a positive integer. The receiving unit is configured to receive information that is about the M clock domains corresponding to the M clock domain numbers and that is sent by the access network device. Information about one clock domain includes first time information and a clock domain number of the clock domain, the first time information includes a time of a clock source of the clock domain when the access network device sends the information about the clock domain, the clock domain number is used to identify the clock domain, and N is an integer greater than 1. The processing unit is configured to separately perform clock synchronization with clock sources of the M clock domains based on the information about the M clock domains.

In a possible implementation, the information about the clock domain further includes a frequency offset ratio between a local clock of the access network device and the clock source of the clock domain.

In a possible implementation, the receiving unit is specifically configured to: receive broadcast information sent by the access network device, where the broadcast information includes the information about the M clock domains; or receive unicast information sent by the access network device, where the unicast information includes the information about M clock domains; or receive M pieces of unicast information sent by the access network device, where one piece of unicast information includes information about one of the M clock domains.

In a possible implementation, the processing unit is further configured to: before the sending unit sends, to the access network device, the clock domain numbers of the M clock domains associated with the terminal, determine the M clock domains associated with the terminal.

In a possible implementation, that the processing unit is configured to determine the M clock domains associated with the terminal specifically includes: in a procedure of establishing a session, obtaining, from a core network element, the clock domain numbers of the M clock domains associated with the terminal. The core network element stores an association relationship between an identifier of the terminal and the clock domain numbers of the M clock domains. The identifier of the terminal includes one or more of the following: a GPSI of the terminal, an IP address associated with the session, and at least one MAC address associated with the terminal.

In a possible implementation, that the processing unit is configured to determine the M clock domains associated with the terminal specifically includes: obtaining, from a core network element, the clock domain numbers of the M clock domains associated with the terminal. The core network element includes a data management network element or a policy control network element. The core network element stores an association relationship between subscription information of the terminal and the clock domain numbers of the M clock domains associated with the terminal; or the core network element stores subscription information of the terminal, and the subscription information includes the clock domain numbers of the M clock domains.

In a possible implementation, the processing unit is further configured to: before the receiving unit receives the information that is about the M clock domains and that is sent by the access network device, perform timing advance measurement with the access network device to obtain a timing advance value, where the timing advance value is used to determine a transmission delay between the terminal and the access network device.

In a possible implementation, that the processing unit is configured to perform the clock synchronization with the clock sources of the M clock domains based on the information about the M clock domains specifically includes: for an $i^{th}$ clock domain of the M clock domains, determining second time information of the $i^{th}$ clock domain based on information about the $i^{th}$ clock domain and the timing advance value. The second time information includes a time of a clock source of the $i^{th}$ clock domain when the terminal receives the information that is about the $i^{th}$ clock domain and that is sent by the access network device, and i ranges from 1 to M.

In a third application, the apparatus 800 may be the session management network element in any one of the foregoing embodiments, or may be a chip in the session management network element. For example, when the apparatus 800 may be the session management network element, the processing unit 802 may be, for example, a processor, the communications unit may be, for example, a transceiver, and the transceiver includes a radio frequency circuit. Optionally, the storage unit may be, for example, a memory. For example, when the apparatus 800 may be the chip in the session management network element, the processing unit 802 may be, for example, a processor, and the communications unit may be, for example, an input/output interface, a pin, a circuit, or the like. Optionally, the storage unit is a storage unit in the chip, for example, a register or a cache. The storage unit may further be a storage unit, such as a ROM, another type of static storage device that can store static information and an instruction, or a RAM, that is outside the chip and that is in the session management network element.

Specifically, when the communications unit 803 includes the sending unit and the receiving unit, the receiving unit is configured to receive a session request message that is from a terminal. The sending unit is configured to send an authentication authorization request message to an authentication authorization and accounting device. The authentication authorization request message includes an identifier of the terminal. The receiving unit is further configured to receive clock domain numbers that are of M clock domains and that are sent by the authentication authorization and accounting device. The M clock domains are clock domains associated with the terminal, and there is an association relationship between the clock domain numbers of the M clock domains and the identifier of the terminal. The sending unit is further configured to send the clock domain numbers of the M clock domains to the terminal. The identifier of the terminal includes one or more of the following: a GPSI of the terminal, an IP address associated with a session, and at least one MAC address associated with the terminal.

In a fourth application, the apparatus 800 may be the data management network element in any one of the foregoing embodiments, or may be a chip in the data management network element. For example, when the apparatus 800 may be the data management network element, the processing unit 802 may be, for example, a processor, the communications unit may be, for example, a transceiver, and the transceiver includes a radio frequency circuit. Optionally, the storage unit may be, for example, a memory. For example, when the apparatus 800 may be the chip in the data management network element, the processing unit 802 may be, for example, a processor, and the communications unit may be, for example, an input/output interface, a pin, a circuit, or the like. Optionally, the storage unit is a storage unit in the chip, for example, a register or a cache. The storage unit may further be a storage unit, such as a ROM, another type of static storage device that can store static information and an instruction, or a RAM, that is outside the chip and that is in the data management network element.

Specifically, when the communications unit 803 includes the sending unit and the receiving unit, the processing unit is configured to: obtain subscription information of the terminal; and determine, based on the subscription information of the terminal, clock domain numbers of M clock domains associated with the terminal. The sending unit is configured to send the clock domain numbers of the M clock domains to the terminal. The data management network element stores an association relationship between the subscription information of the terminal and the clock domain numbers of M clock domains associated with the terminal: or the data management network element stores the subscription information of the terminal, and the subscription information includes the clock domain numbers of the M clock domains.

In a fifth application, the apparatus 800 may be the policy control network element in any one of the foregoing embodiments, or may be a chip in the policy control network element. For example, when the apparatus 800 may be the policy control network element, the processing unit 802 may be, for example, a processor, the communications unit may be, for example, a transceiver, and the transceiver includes a radio frequency circuit. Optionally, the storage unit may be, for example, a memory. For example, when the apparatus 800 may be the chip in the policy control network element, the processing unit 802 may be, for example, a processor, and the communications unit may be, for example, an input/output interface, a pin, a circuit, or the like. Optionally, the storage unit is a storage unit in the chip, for example, a register or a cache. The storage unit may further be a storage unit, such as a ROM, another type of static storage device that can store static information and an instruction, or a RAM, that is outside the chip and that is in the policy control network element.

Specifically, when the communications unit 803 includes the sending unit and the receiving unit, the processing unit is configured to generate policy information, where the policy information includes the clock domain numbers of the M clock domains corresponding to the application to which the terminal subscribes. The sending unit is configured to send the policy information to the terminal.

In a possible implementation, the policy information includes the clock domain numbers of the M clock domains corresponding to the application to which the terminal subscribes. In this way, the processing unit is further configured to: before generating the policy information, obtain the subscription information of the terminal from the data storage network element, where the subscription information includes the application to which the terminal subscribes, and determine the clock domain numbers of the M clock domains corresponding to the application to which the terminal subscribes.

When the apparatus shown in FIG. 8 is the terminal, the access network device, the session management network element, the data management network element, or the policy control network element, for specific beneficial effects of the clock synchronization method or the clock domain determining method that is used to be performed, refer to related descriptions in the foregoing method embodiments. Details are not described herein again.

Figure 9:
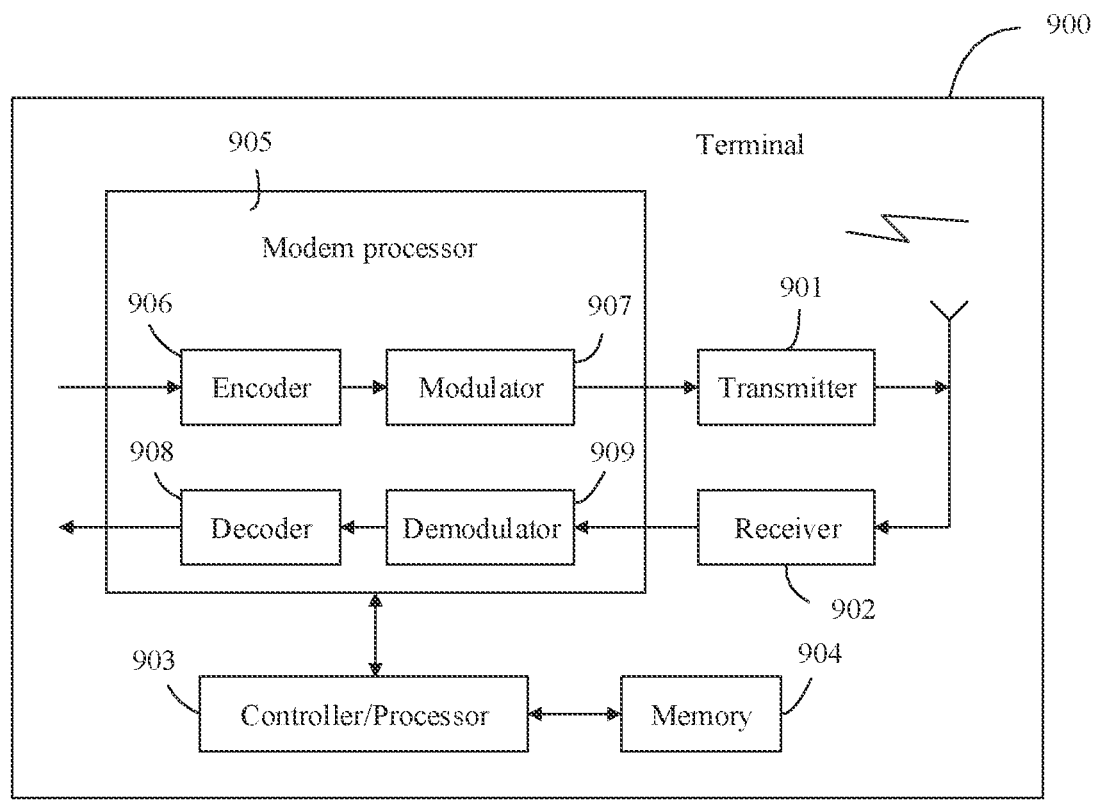
FIG. 9 is a schematic diagram of a terminal according to this application.

FIG. 9 is a simplified schematic diagram of a possible designed structure of a terminal according to an embodiment of the present invention. The terminal 900 includes a transmitter 901, a receiver 902, and a processor 903. The processor 903 may also be a controller, and is represented as the "controller/processor 903" in FIG. 9. Optionally, the terminal 900 may further include a modem processor 905. The modem processor 905 may include an encoder 906, a modulator 907, a decoder 908, and a demodulator 909.

In an example, the transmitter 901 adjusts (for example, through analog conversion, filtering, amplification, and up-conversion) an output sample and generates an uplink signal. The uplink signal is transmitted to the access network device in the foregoing embodiment through an antenna. On a downlink, the antenna receives a downlink signal transmitted by the access network device in the foregoing embodiment. The receiver 902 adjusts (for example, through filtering, amplification, down-conversion, and digitization) a signal received from the antenna and provides an input sample. In the modem processor 905, the encoder 906 receives service data and a signaling message that are to be sent on an uplink, and processes (for example, formats, encodes, and interleaves) the service data and the signaling message. The modulator 907 further processes (such as through symbol mapping and modulation) encoded service data and an encoded signaling message, and provides an output sample. The demodulator 909 processes (for example, demodulates) the input sample and provides symbol estimation. The decoder 908 processes (for example, de-interleaves and decodes) the symbol estimation and provides the decoded data and signaling message that are to be sent to the terminal 900. The encoder 906, the modulator 907, the demodulator 909, and the decoder 908 may be implemented by the combined modem processor 905. The units perform processing based on a radio access technology used by a radio access network. It should be noted that when the terminal 900 does not include the modem processor 905, the foregoing functions of the modem processor 905 may also be implemented by the processor 903.

The processor 903 controls and manages the terminal 900, and is configured to perform a processing process performed by the terminal in the foregoing embodiments of the present invention. For example, the processor 903 is configured to perform the processing processes of the terminal in the clock synchronization method in any one of the embodiments of this application and/or another process of the technical solutions described in this application.

Further, the terminal 900 may further include a memory 904, and the memory 904 is configured to store program code and data of the terminal 900.

Figure 10:
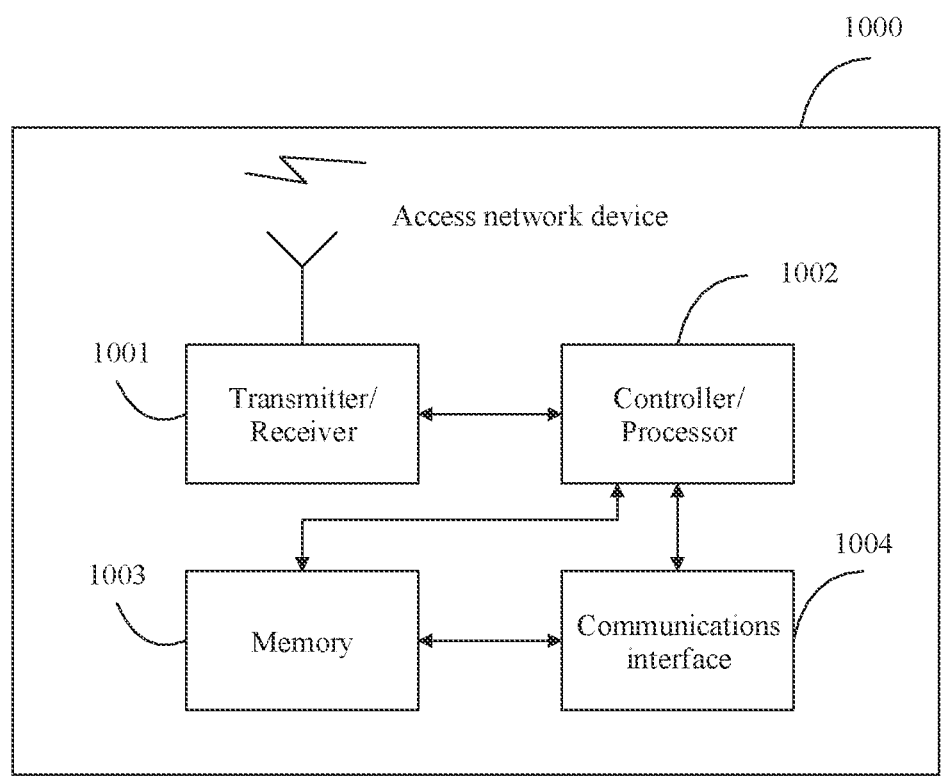
FIG. 10 is a schematic diagram of an access network device according to this application.

FIG. 10 is a possible schematic structural diagram of an access network device according to an embodiment of the present invention. The access network device 1000 includes a processor 1002 and a communications interface 1004. The processor 1002 may also be a controller, and is represented as the "controller/processor 1002" in FIG. 10. The communications interface 1004 is configured to support the access network device in communicating with a terminal. Further, the access network device 1000 may include a transmitter/receiver 1001. The transmitter/receiver 1001 is configured to support radio communication between the access network device and the terminal in the foregoing embodiments. The processor 1002 may execute various functions for communicating with the terminal. In an uplink, an uplink signal that is from the terminal is received through an antenna, is demodulated (for example, a high frequency signal is demodulated into a baseband signal) by the receiver 1001, and is further processed by the processor 1002 to recover service data and signaling information that are sent by the terminal. In a downlink, service data and a signaling message are processed by the processor 1002, and are modulated (for example, a baseband signal is modulated into a high frequency signal) by the transmitter 1001 to generate a downlink signal, and the downlink signal is transmitted to the terminal through an antenna. It should be noted that the foregoing demodulation or modulation function may also be implemented by the processor 1002.

For example, the processor 1002 is further configured to perform the processing processes of the access network device in any clock synchronization method in the embodiments of this application and/or another process of the technical solutions described in this application.

Further, the access network device 1000 may include a memory 1003, and the memory 1003 is configured to store program code and data of the access network device 1000.

It may be understood that FIG. 10 shows only a simplified design of the access network device 1000. In actual application, the access network device 1000 may include any quantity of transmitters, receivers, processors, controllers, memories, communications units, and the like, and all access network devices that can implement the embodiments of the present invention fall within the protection scope of the embodiments of the present invention.

Figure 11:
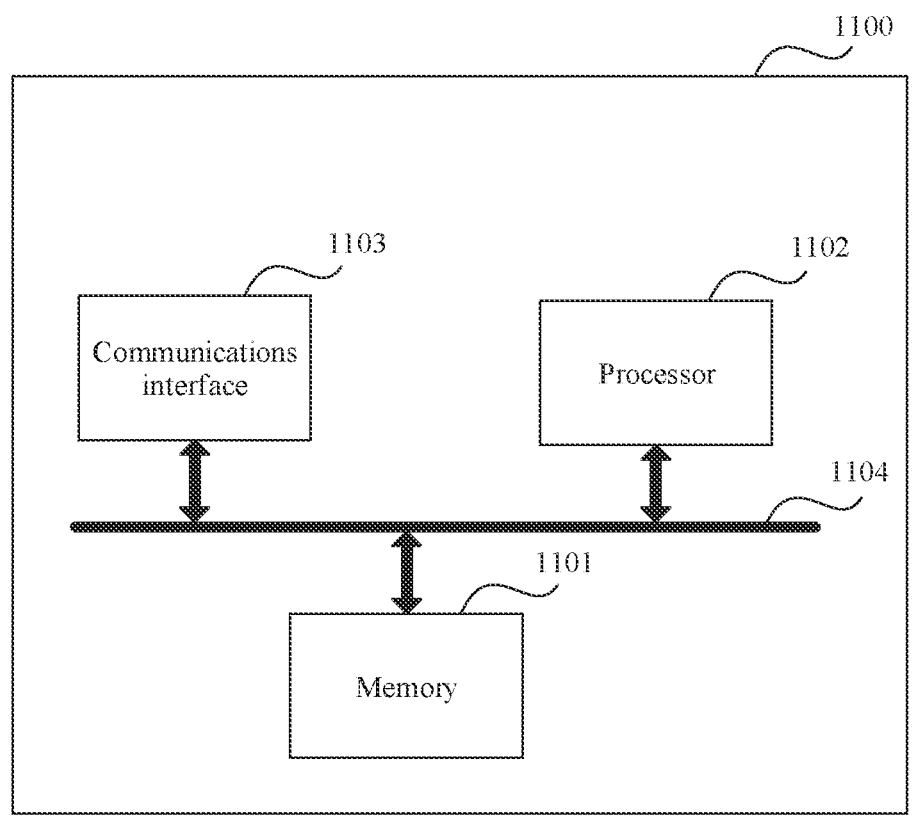
FIG. 11 is a schematic diagram of an apparatus according to this application.

FIG. 11 is a schematic diagram of an apparatus according to this application. The apparatus may be the foregoing session management network element, data management network element, or policy control network element. The apparatus 1100 includes a processor 1102, a communications interface 1103, and a memory 1101. Optionally, the apparatus 1100 may further include a bus 1104. The communications interface 1103, the processor 1102, and the memory 1101 may be connected to each other through the communication line 1104. The communication line 1104 may be a peripheral component interconnect (PCI for short) bus, an extended industry standard architecture (EISA for short) bus, or the like. The communication line 1104 may be classified into an address bus, a data bus, a control bus, and the like. For ease of representation, only one thick line is used to represent the bus in FIG. 11, but this does not mean that there is only one bus or only one type of bus.

The processor 1102 may be a CPU, a microprocessor, an ASIC, or one or more integrated circuits configured to control program execution in the solutions of this application.

The communications interface 1103 uses any apparatus like a transceiver, and is configured to communicate with another device or a communications network, such as the Ethernet, a radio access network (RAN), a wireless local area network (WLAN), or a wired access network.

The memory 1101 may be a read-only memory (ROM) or another type of static storage device that can store static information and an instruction, or a random access memory (RAM) or another type of dynamic storage device that can store information and an instruction, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer, but is not limited thereto. The memory may exist independently, and is connected to the processor through the communication line 1104. The memory may alternatively be integrated with the processor.

The memory 1101 is configured to store a computer executable instruction for executing the solutions in this application, and the processor 1102 controls the execution. The processor 1102 is configured to execute the computer executable instruction stored in the memory 1101, to implement the method for determining the clock domain provided in the foregoing embodiments of this application.

Optionally, the computer executable instruction in this embodiment of this application may also be referred to as application program code. This is not specifically limited in this embodiment of this application.

A person of ordinary skill in the art may understand that first, second, and various reference numerals in this application are merely distinguished for convenient description, and are not used to limit a scope of the embodiments of this application, and also indicate a sequence. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. The term "at least one" refers to one or more. At least two means two or more. "At least one", "any one", or a similar expression thereof means any combination of the items, including a singular item (piece) or any combination of plural items (pieces). For example, at least one (piece, or type) of a, b, or c may indicate: a, b, c, a-b, a-c, b-c, or a-b-c, where a, b, and c may be singular or plural.

All or some of the foregoing embodiments may be implemented through software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The various illustrative logical units and circuits described in the embodiments of this application may implement or operate the described functions by using a general purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general purpose processor may be a microprocessor. Optionally, the general purpose processor may alternatively be any conventional processor, controller, microcontroller, or state machine. The processor may also be implemented by a combination of computing apparatuses, such as a digital signal processor and a microprocessor, a plurality of microprocessors, one or more microprocessors in combination with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may be connected to a processor, so that the processor may read information from the storage medium and write information to the storage medium. Optionally, the storage medium may further be integrated into the processor. The processor and the storage medium may be disposed in an ASIC, and the ASIC may be disposed in a terminal. Optionally, the processor and the storage medium may be alternatively disposed in different components of the terminal.

The computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more procedures in the flowcharts and/or in one or more blocks in the block diagrams.

Although this application is described with reference to specific features and the embodiments thereof, it is clear that various modifications and combinations may be made to them without departing from the spirit and scope of this application. Correspondingly, the specification and accompanying drawings are merely example description of this application defined by the appended claims, and are considered as any of or all modifications, variations, combinations or equivalents that cover the scope of this application. Obviously, a person skilled in the art can make various modifications and variations to this application without departing from the scope of this application. This application is intended to cover these modifications and variations of this application provided that they fall within the scope of the claims of this application and their equivalent technologies.

What is claimed is:

1. A clock synchronization method, comprising:
receiving, by a terminal, information that is about N clock domains and that is sent by an access network device, wherein information about a clock domain comprises first time information and a clock domain number of the clock domain, the first time information comprises a time of a clock source of the clock domain when the access network device sends the information about the clock domain, the clock domain number identifies the clock domain, and N is an integer greater than 1;
determining, by the terminal, M clock domains that are associated with the terminal and that are in the N clock domains, wherein M is an integer greater than 1; and
separately performing, by the terminal, clock synchronization with clock sources of the M clock domains based on information about the M clock domains.

2. The method according to claim 1, wherein the information about the clock domain further comprises a frequency offset ratio between a local clock of the access network device and the clock source of the clock domain.

3. The method according to claim 1, wherein receiving, by the terminal, the information that is about the N clock domains and that is sent by the access network device comprises one of:
receiving, by the terminal, broadcast information sent by the access network device, wherein the broadcast information comprises the information about the N clock domains;
receiving, by the terminal, unicast information sent by the access network device, wherein the unicast information comprises the information about the N clock domains; or
receiving, by the terminal, N pieces of unicast information sent by the access network device, wherein each piece of unicast information comprises information about a respective one of the N clock domains.

4. The method according to claim 1, wherein determining, by the terminal, the M clock domains that are associated with the terminal and that are in the N clock domains comprises:
in a procedure of establishing a session, obtaining, by the terminal from a core network element and based on an identifier of the terminal stored at the core network element, clock domain numbers of the M clock domains associated with the terminal,
wherein the identifier of the terminal is associated with the clock domain numbers of the M clock domains in the core network element, and
wherein the identifier of the terminal comprises at least one of:
a generic public subscription identifier (GPSI) of the terminal;
an IP address associated with the session; or
at least one media access control (MAC) address associated with the terminal.

5. The method according to claim 1, wherein determining, by the terminal, the M clock domains that are associated with the terminal and that are in the N clock domains comprises:
obtaining, by the terminal from a core network element and based on subscription information of the terminal stored at the core network element, clock domain numbers of the M clock domains associated with the terminal,
wherein the core network element comprises a data management network element or a policy control network element, and
wherein the subscription information of the terminal is associated with the clock domain numbers of the M clock domains associated with the terminal in the core network element, or the subscription information of the terminal comprises the clock domain numbers of the M clock domains.

6. The method according to claim 1, wherein before receiving, by the terminal, the information that is about the N clock domains and that is sent by the access network device, the method comprises:
performing, by the terminal, timing advance measurement with the access network device to obtain a timing advance value, wherein the timing advance value is used to determine a transmission delay between the terminal and the access network device.

7. The method according to claim 6, wherein performing, by the terminal, the clock synchronization with the clock sources of the M clock domains based on the information about the M clock domains comprises:
for an $i^{th}$ clock domain of the M clock domains, determining, by the terminal, second time information of the $i^{th}$ clock domain based on information about the $i^{th}$ clock domain and the timing advance value, wherein the second time information comprises a time of a clock source of the $i^{th}$ clock domain when the terminal receives the information about the $i^{th}$ clock domain that is sent by the access network device, and i is an integer within a range from 1 to M.

8. A clock synchronization method, comprising:
separately performing, by an access network device, clock synchronization with clock sources of N clock domains; and
after completing the clock synchronization with the clock sources of the N clock domains, sending, by the access network device, information about the N clock domains to a terminal,
wherein information about a clock domain comprises first time information and a clock domain number of the clock domain, the first time information comprises a time of a clock source of the clock domain when the access network device sends the information about the clock domain, the clock domain number identifies the clock domain, and N is an integer greater than 1.

9. The method according to claim 8, wherein the information about the clock domain further comprises a frequency offset ratio between a local clock of the access network device and the clock source of the clock domain.

10. The method according to claim 8, wherein sending, by the access network device, the information about the N clock domains to the terminal comprises one of:
sending, by the access network device, broadcast information, wherein the broadcast information comprises the information about the N clock domains;

sending, by the access network device, unicast information to the terminal, wherein the unicast information comprises the information about the N clock domains; or sending, by the access network device, N pieces of unicast information to the terminal, wherein each piece of unicast information comprises information about a respective one of the N clock domains.

11. The method according to claim 8, wherein, before sending, by the access network device, the information about the N clock domains to the terminal, the method further comprises:

receiving, by the access network device, clock domain numbers that are of the N clock domains and that are sent by the terminal or a core network element.

12. An apparatus, comprising:

a receiver configured to receive information that is about N clock domains and that is sent by an access network device, wherein information about a clock domain comprises first time information and a clock domain number of the clock domain, the first time information comprises a time of a clock source of the clock domain when the access network device sends the information about the clock domain, the clock domain number identifies the clock domain, and N is an integer greater than 1;

at least one processor; and one or more memories coupled to the at least one processor and storing programming instructions for execution by the at least one processor to perform operations comprising:

determining M clock domains that are associated with the apparatus and that are in the N clock domains, wherein M is an integer greater than 1; and separately performing clock synchronization with clock sources of the M clock domains based on information about the M clock domains.

13. The apparatus according to claim 12, wherein the information about the clock domain further comprises a frequency offset ratio between a local clock of the access network device and the clock source of the clock domain.

14. The apparatus according to claim 12, wherein the receiver is configured to receive the information that is about the N clock domains by receiving one of:

broadcast information sent by the access network device, wherein the broadcast information comprises the information about the N clock domains;

unicast information sent by the access network device, wherein the unicast information comprises the information about the N clock domains; or N pieces of unicast information sent by the access network device, wherein each piece of unicast information comprises information about a respective one of the N clock domains.

15. The apparatus according to claim 12, wherein determining the M clock domains that are associated with the apparatus and that are in the N clock domains comprises:

in a procedure of establishing a session, obtaining, from a core network element and based on an identifier of the apparatus stored at the core network element, clock domain numbers of the M clock domains associated with the apparatus, wherein the identifier of the apparatus is associated with the clock domain numbers of the M clock domains in the core network element, and wherein the identifier of the apparatus comprises at least one of:

a generic public subscription identifier (GPSI) of the apparatus;

an IP address associated with the session: or at least one media access control (MAC) address associated with the apparatus.

16. The apparatus according to claim 12, wherein determining the M clock domains that are associated with the apparatus and that are in the N clock domains comprises:

obtaining, from a core network element and based on subscription information of the apparatus stored at the core network element, clock domain numbers of the M clock domains associated with the apparatus, wherein the core network element comprises a data management network element or a policy control network element, and wherein the subscription information of the apparatus is associated with the clock domain numbers of the M clock domains associated with the apparatus in the core network element, or the subscription information of the apparatus comprises the clock domain numbers of the M clock domains.

17. The apparatus according to claim 12, wherein the operations further comprise:

before the receiver receives the information that is about the N clock domains and that is sent by the access network device, performing a timing advance measurement with the access network device to obtain a timing advance value, wherein the timing advance value is used to determine a transmission delay between the apparatus and the access network device.

18. The apparatus according to claim 17, wherein performing the clock synchronization with the clock sources of the M clock domains based on the information about the M clock domains comprises:

for an $i^{th}$ clock domain of the M clock domains, determining second time information of the $i^{th}$ clock domain based on information about the $i^{th}$ clock domain and the timing advance value, wherein the second time information comprises a time of a clock source of the $i^{th}$ clock domain when the apparatus receives the information about the $i^{th}$ clock domain that is sent by the access network device, and i is an integer within a range from 1 to M.

* * * * *

UNITED STATES PATENT AND TRADEMARK OFFICE
CERTIFICATE OF CORRECTION

PATENT NO. : 11,451,316 B2
APPLICATION NO. : 17/208044
DATED : September 20, 2022
INVENTOR(S) : Fangyuan Zhu et al.

It is certified that error appears in the above-identified patent and that said Letters Patent is hereby corrected as shown below:

In the Claims

In Column 40, In Line 14 (approx.), In Claim 15, delete "session:" and insert -- session; --.

Signed and Sealed this
Twenty-fifth Day of April, 2023

Katherine Kelly Vidal
*Director of the United States Patent and Trademark Office*